US012665687B2

(12) United States Patent
Inomata et al.

(10) Patent No.: US 12,665,687 B2
(45) Date of Patent: Jun. 23, 2026

(54) COMMUNICATION DESIGN SUPPORT APPARATUS, COMMUNICATION DESIGN SUPPORT METHOD AND PROGRAM

(71) Applicant: NTT, Inc., Tokyo (JP)

(72) Inventors: Minoru Inomata, Tokyo (JP); Wataru Yamada, Tokyo (JP); Nobuaki Kuno, Tokyo (JP); Motoharu Sasaki, Tokyo (JP)

(73) Assignee: NTT, Inc., Tokyo (JP)

( * ) Notice: Subject to any disclaimer, the term of this patent is extended or adjusted under 35 U.S.C. 154(b) by 296 days.

(21) Appl. No.: 18/548,117

(22) PCT Filed: Apr. 5, 2021

(86) PCT No.: PCT/JP2021/014534

§ 371 (c)(1),
(2) Date: Aug. 28, 2023

(87) PCT Pub. No.: WO2022/215133

PCT Pub. Date: Oct. 13, 2022

(65) Prior Publication Data

US 2024/0162996 A1 May 16, 2024

(51) Int. Cl.
*H04B 17/391* (2015.01)
*H04B 17/309* (2015.01)

(52) U.S. Cl.
CPC ......... *H04B 17/391* (2015.01); *H04B 17/347* (2023.05)

(58) Field of Classification Search
CPC ........................... H04B 17/391; H04B 17/347
See application file for complete search history.

(56) References Cited

U.S. PATENT DOCUMENTS

2015/0173103 A1* 6/2015 Lunden ............... H04L 67/1097
                                                        370/329
2018/0292795 A1* 10/2018 Burt ........................ G05B 15/02
2021/0036792 A1* 2/2021 Torrico .............. H04B 17/3911

OTHER PUBLICATIONS

Ryuichi Takechi et al., Technology to Optimize Radio Access Networks: Son, Fujitsu. 62, 4, p. 49-454, Jul. 2011, https://www.fujitsu.com/downloads/JP/archive/imgjp/jmag/vol62-4/paper15.pdf.

* cited by examiner

*Primary Examiner* — Natasha W Cosme
(74) *Attorney, Agent, or Firm* — IPUSA, PLLC

(57) ABSTRACT

A communication design support apparatus includes: a propagation model storage unit that stores a propagation model; an acquisition unit that acquires data in which structure data containing coordinate data is associated with data indicating propagation loss; and a selection unit that selects data indicating classification of a characteristic of a communication environment in a structure indicated by the structure data based on the acquired data.

8 Claims, 16 Drawing Sheets

Fig. 1

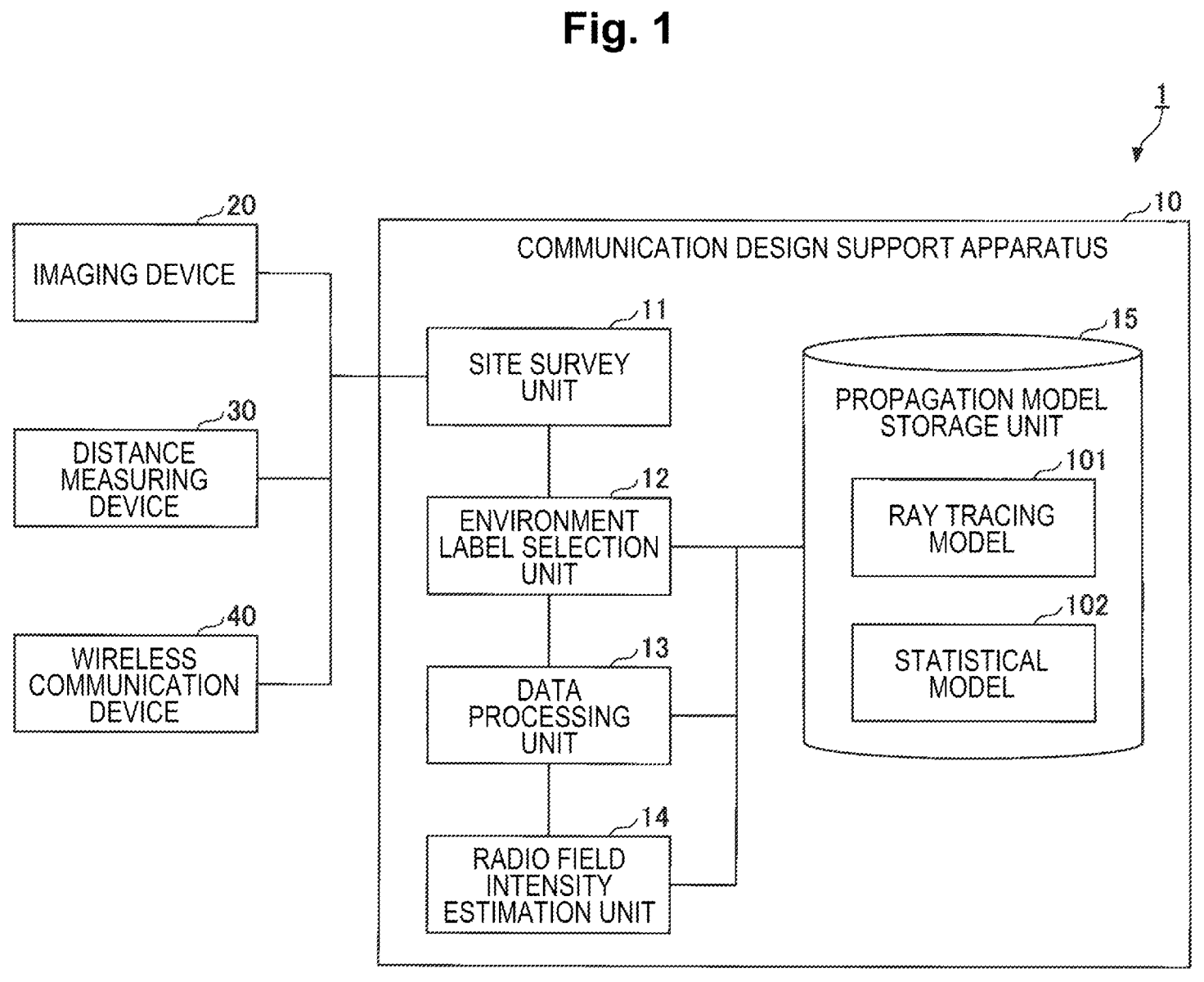

COMMUNICATION DESIGN SUPPORT APPARATUS 10

PROPAGATION MODEL STORAGE UNIT 15

RAY TRACING MODEL 101

STATISTICAL MODEL 102

SITE SURVEY UNIT 11

ENVIRONMENT LABEL SELECTION UNIT 12

DATA PROCESSING UNIT 13

RADIO FIELD INTENSITY ESTIMATION UNIT 14

IMAGING DEVICE 20

DISTANCE MEASURING DEVICE 30

WIRELESS COMMUNICATION DEVICE 40

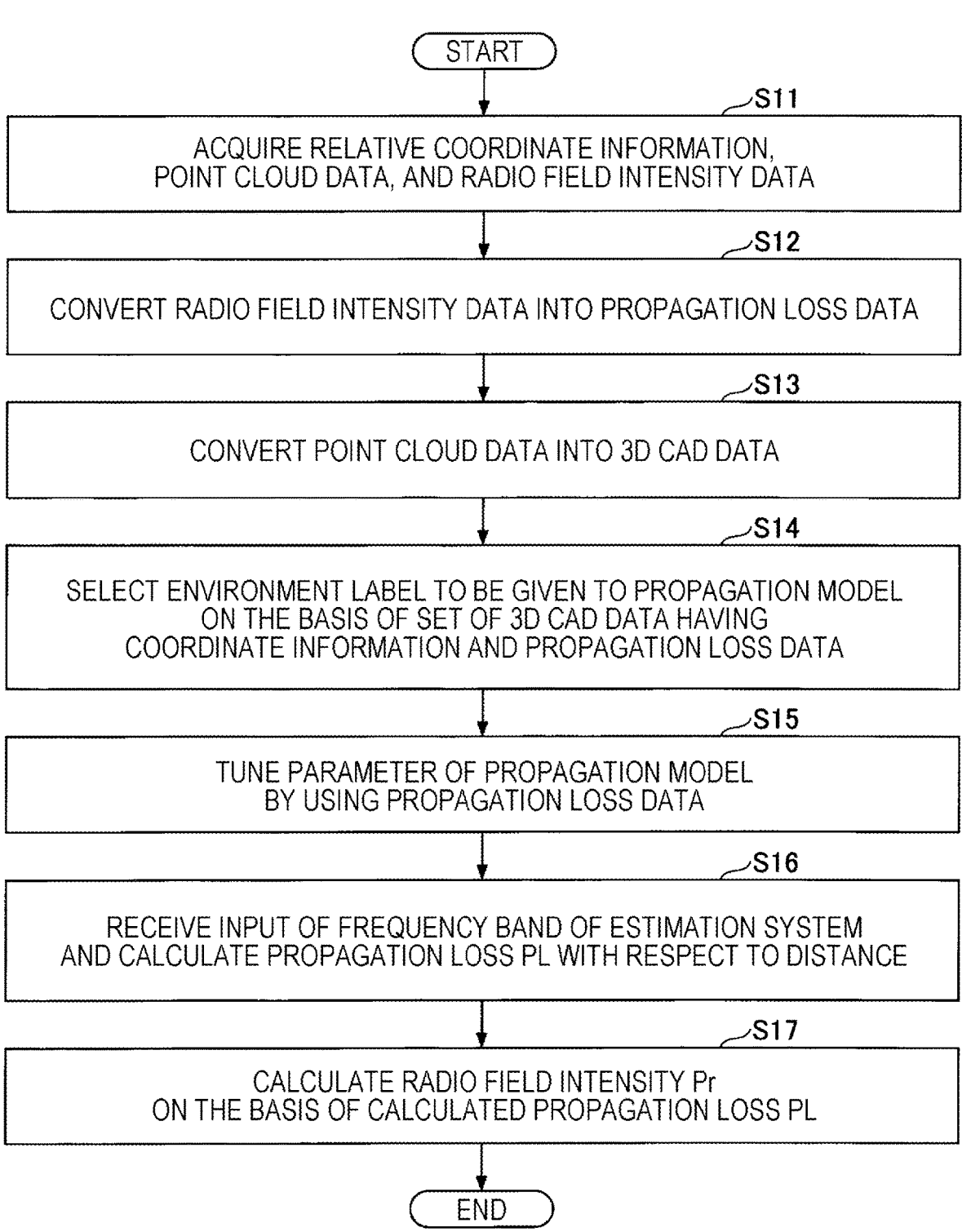

START

S11
ACQUIRE RELATIVE COORDINATE INFORMATION,
POINT CLOUD DATA, AND RADIO FIELD INTENSITY DATA

S12
CONVERT RADIO FIELD INTENSITY DATA INTO PROPAGATION LOSS DATA

S13
CONVERT POINT CLOUD DATA INTO 3D CAD DATA

S14
SELECT ENVIRONMENT LABEL TO BE GIVEN TO PROPAGATION MODEL
ON THE BASIS OF SET OF 3D CAD DATA HAVING
COORDINATE INFORMATION AND PROPAGATION LOSS DATA

S15
TUNE PARAMETER OF PROPAGATION MODEL
BY USING PROPAGATION LOSS DATA

S16
RECEIVE INPUT OF FREQUENCY BAND OF ESTIMATION SYSTEM
AND CALCULATE PROPAGATION LOSS PL WITH RESPECT TO DISTANCE

S17
CALCULATE RADIO FIELD INTENSITY Pr
ON THE BASIS OF CALCULATED PROPAGATION LOSS PL

END

START

S31

ACQUIRE SET OF 3D CAD DATA HAVING COORDINATE INFORMATION AND PROPAGATION LOSS DATA

S32

CALCULATE FIELD INTENSITY E FOR EACH SET OF RELATIVE COORDINATES BY RAY TRACING

S33

CALCULATE PROPAGATION LOSS $PL_{pred}$ ON THE BASIS OF FIELD INTENSITY E

S34

CALCULATE PARAMETER $\rho$ FOR MINIMIZING OPTIMIZATION FUNCTION AT EACH SET OF COORDINATES

END

Fig. 5

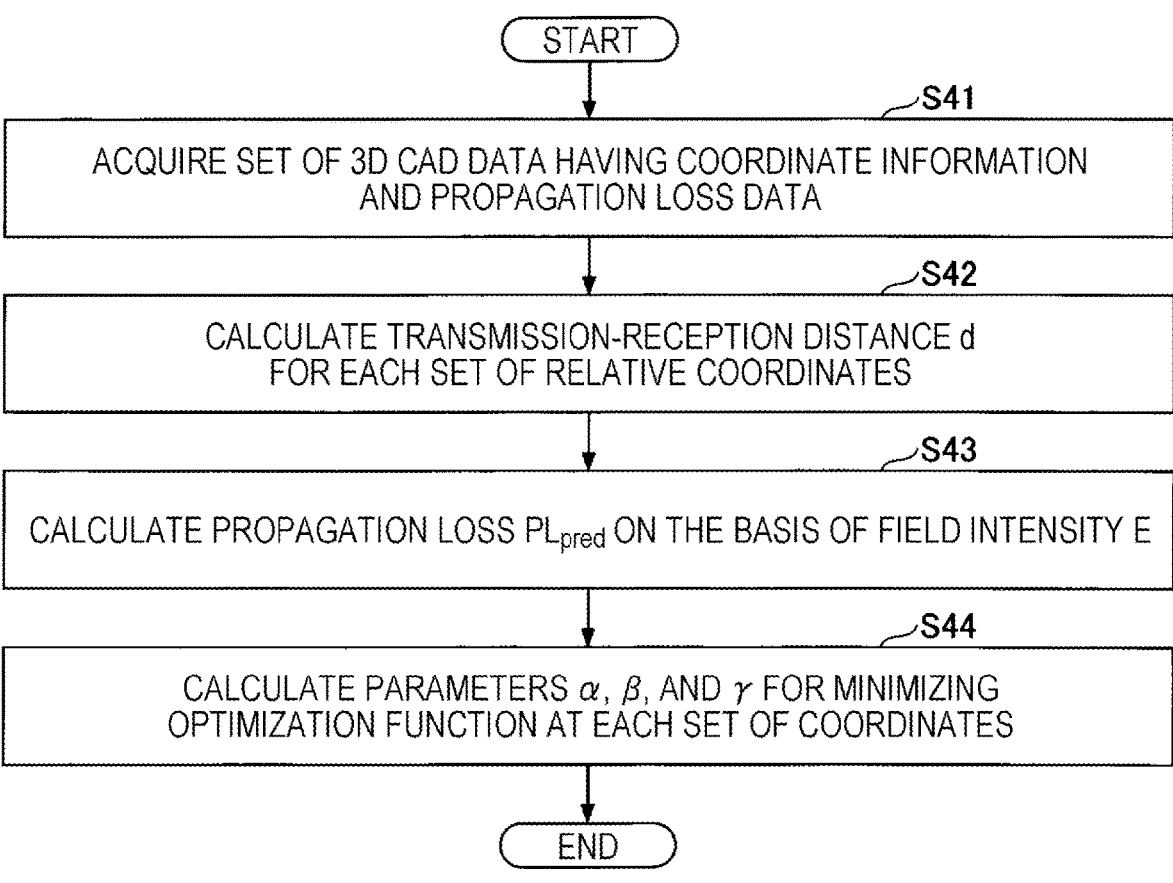

START

S41

ACQUIRE SET OF 3D CAD DATA HAVING COORDINATE INFORMATION
AND PROPAGATION LOSS DATA

S42

CALCULATE TRANSMISSION-RECEPTION DISTANCE d
FOR EACH SET OF RELATIVE COORDINATES

S43

CALCULATE PROPAGATION LOSS $PL_{pred}$ ON THE BASIS OF FIELD INTENSITY E

S44

CALCULATE PARAMETERS $\alpha$, $\beta$, AND $\gamma$ FOR MINIMIZING
OPTIMIZATION FUNCTION AT EACH SET OF COORDINATES

END

Fig. 6

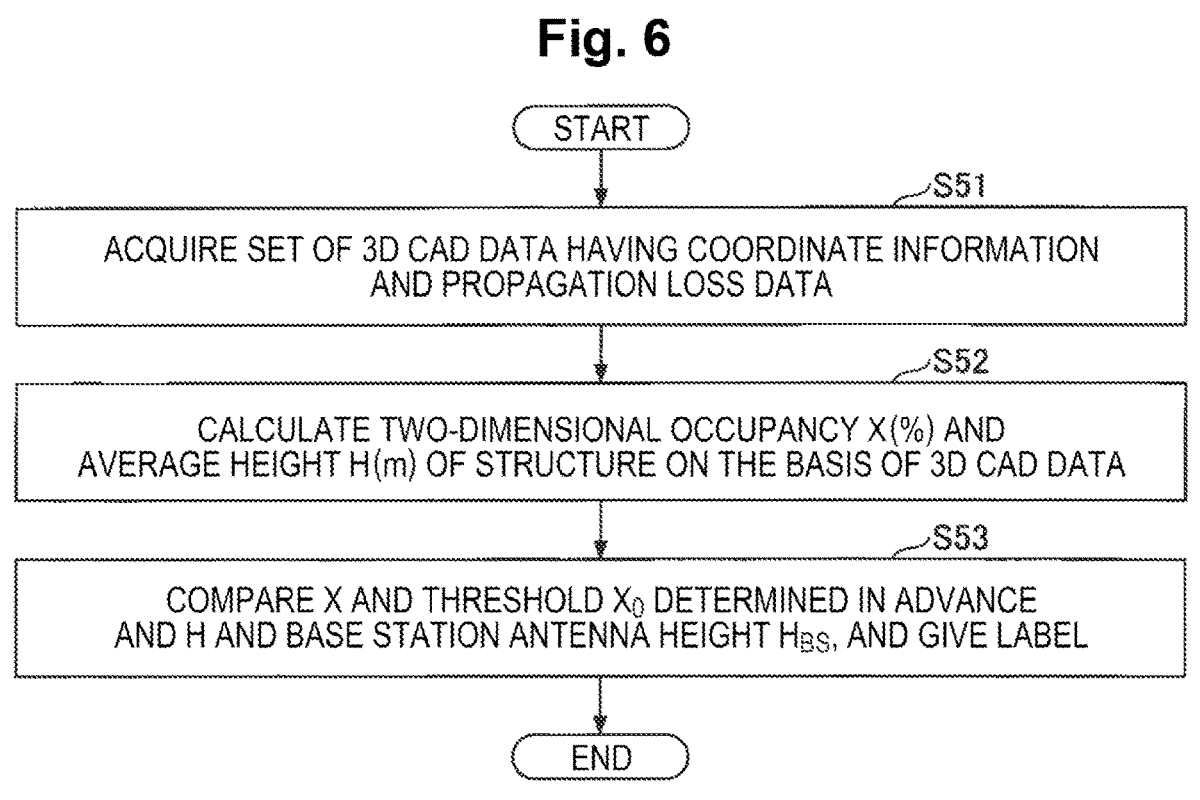

START

S51

ACQUIRE SET OF 3D CAD DATA HAVING COORDINATE INFORMATION AND PROPAGATION LOSS DATA

S52

CALCULATE TWO-DIMENSIONAL OCCUPANCY X(%) AND AVERAGE HEIGHT H(m) OF STRUCTURE ON THE BASIS OF 3D CAD DATA

S53

COMPARE X AND THRESHOLD $X_0$ DETERMINED IN ADVANCE AND H AND BASE STATION ANTENNA HEIGHT $H_{BS}$, AND GIVE LABEL

END

Fig. 7

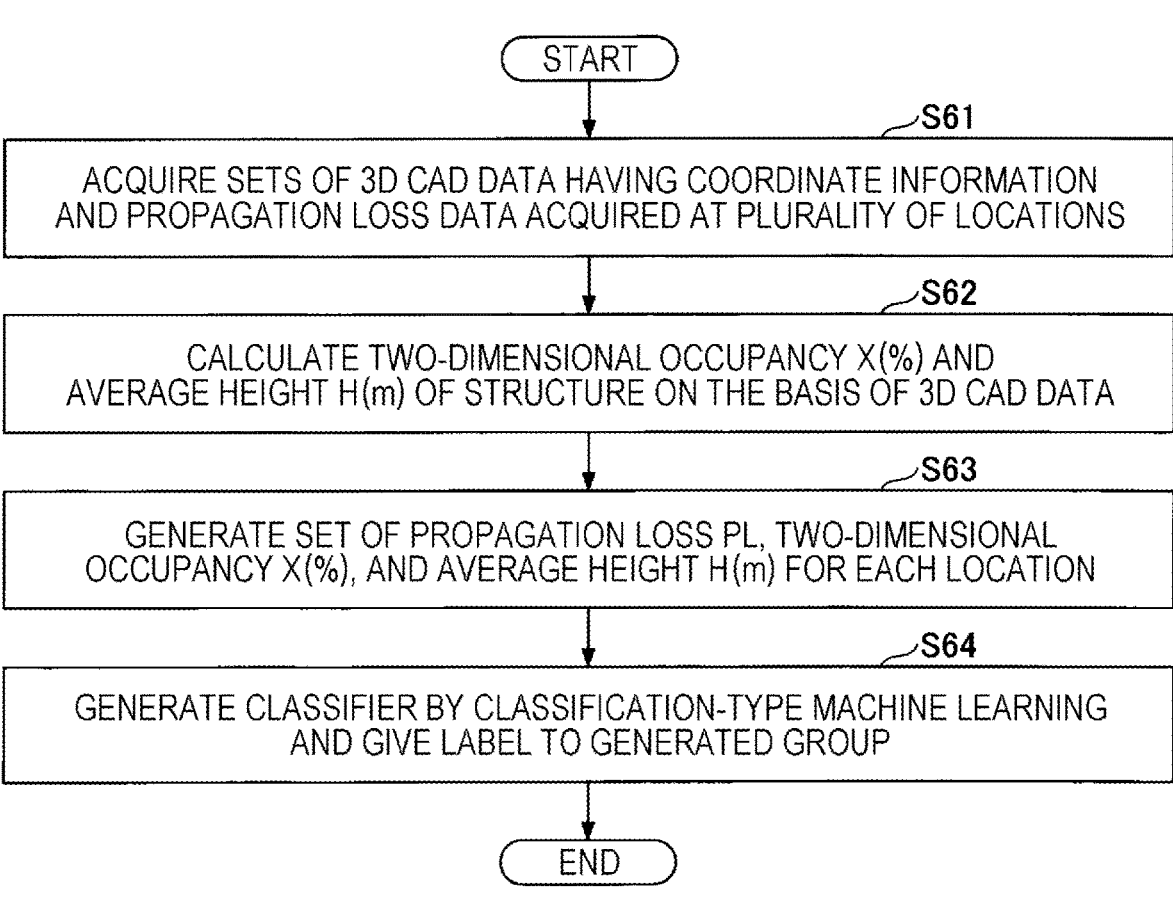

START

S61
ACQUIRE SETS OF 3D CAD DATA HAVING COORDINATE INFORMATION
AND PROPAGATION LOSS DATA ACQUIRED AT PLURALITY OF LOCATIONS

S62
CALCULATE TWO-DIMENSIONAL OCCUPANCY X(%) AND
AVERAGE HEIGHT H(m) OF STRUCTURE ON THE BASIS OF 3D CAD DATA

S63
GENERATE SET OF PROPAGATION LOSS PL, TWO-DIMENSIONAL
OCCUPANCY X(%), AND AVERAGE HEIGHT H(m) FOR EACH LOCATION

S64
GENERATE CLASSIFIER BY CLASSIFICATION-TYPE MACHINE LEARNING
AND GIVE LABEL TO GENERATED GROUP

END

Fig. 8

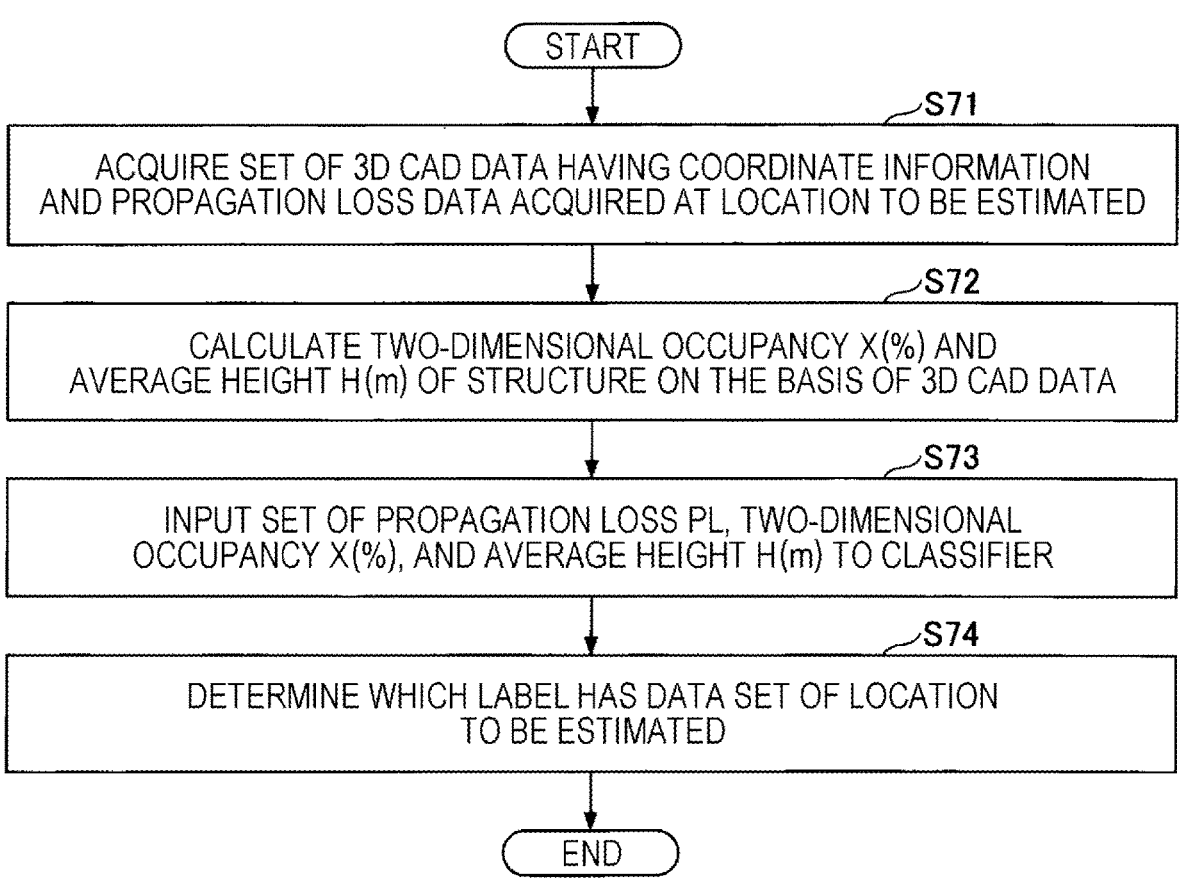

START

S71

ACQUIRE SET OF 3D CAD DATA HAVING COORDINATE INFORMATION AND PROPAGATION LOSS DATA ACQUIRED AT LOCATION TO BE ESTIMATED

S72

CALCULATE TWO-DIMENSIONAL OCCUPANCY X(%) AND AVERAGE HEIGHT H(m) OF STRUCTURE ON THE BASIS OF 3D CAD DATA

S73

INPUT SET OF PROPAGATION LOSS PL, TWO-DIMENSIONAL OCCUPANCY X(%), AND AVERAGE HEIGHT H(m) TO CLASSIFIER

S74

DETERMINE WHICH LABEL HAS DATA SET OF LOCATION TO BE ESTIMATED

END

Fig. 9

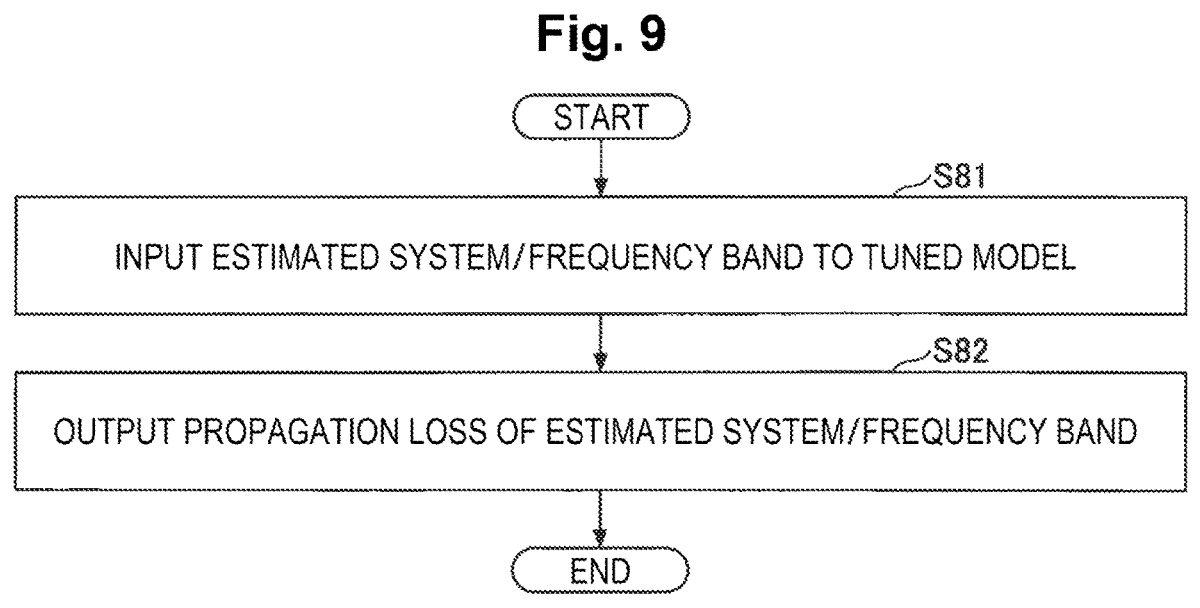

START

S81

INPUT ESTIMATED SYSTEM/FREQUENCY BAND TO TUNED MODEL

S82

OUTPUT PROPAGATION LOSS OF ESTIMATED SYSTEM/FREQUENCY BAND

END

Fig. 12

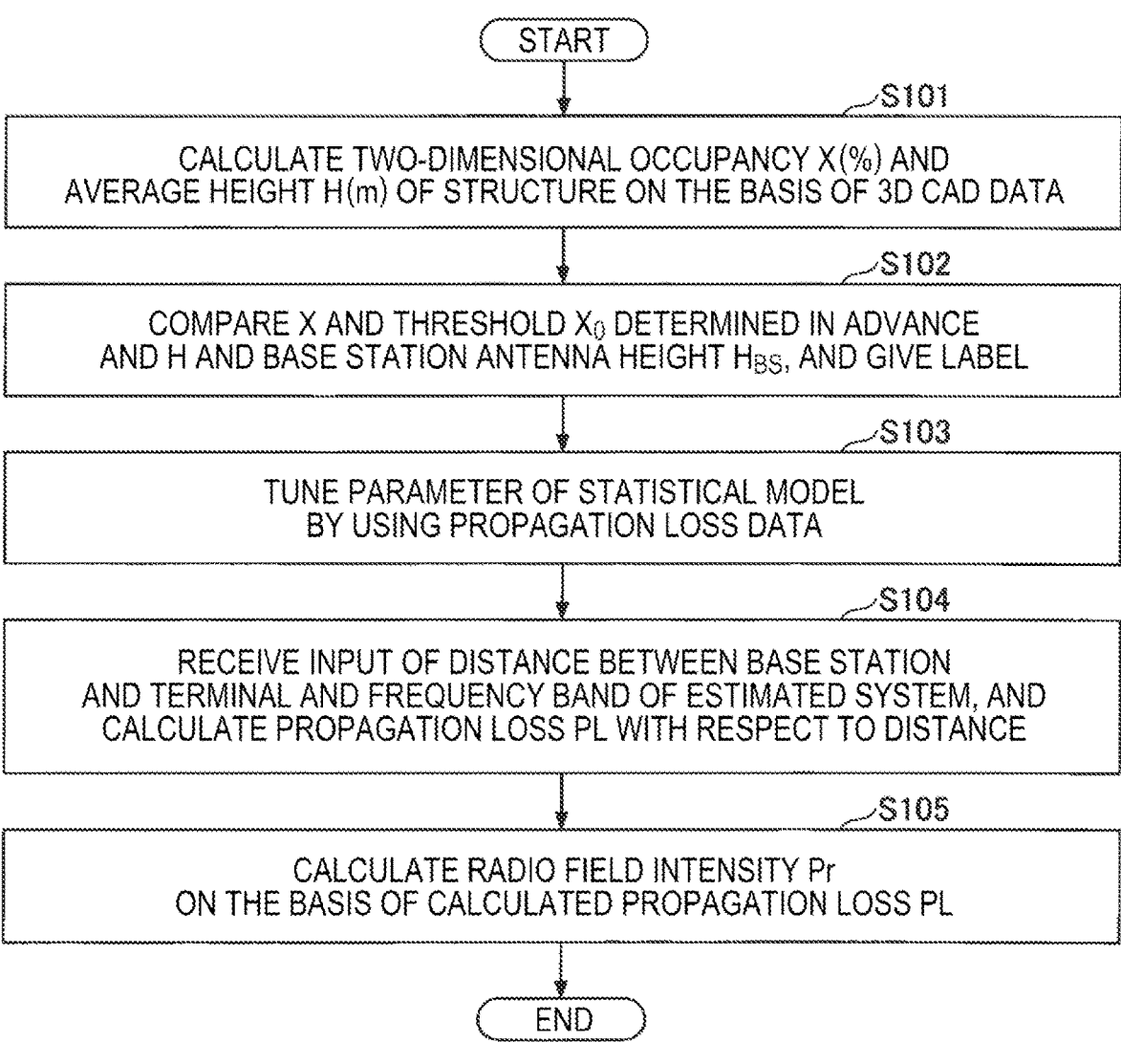

START

S101

CALCULATE TWO-DIMENSIONAL OCCUPANCY X(%) AND
AVERAGE HEIGHT H(m) OF STRUCTURE ON THE BASIS OF 3D CAD DATA

S102

COMPARE X AND THRESHOLD $X_0$ DETERMINED IN ADVANCE
AND H AND BASE STATION ANTENNA HEIGHT $H_{BS}$, AND GIVE LABEL

S103

TUNE PARAMETER OF STATISTICAL MODEL
BY USING PROPAGATION LOSS DATA

S104

RECEIVE INPUT OF DISTANCE BETWEEN BASE STATION
AND TERMINAL AND FREQUENCY BAND OF ESTIMATED SYSTEM, AND
CALCULATE PROPAGATION LOSS PL WITH RESPECT TO DISTANCE

S105

CALCULATE RADIO FIELD INTENSITY Pr
ON THE BASIS OF CALCULATED PROPAGATION LOSS PL

END

Fig. 13

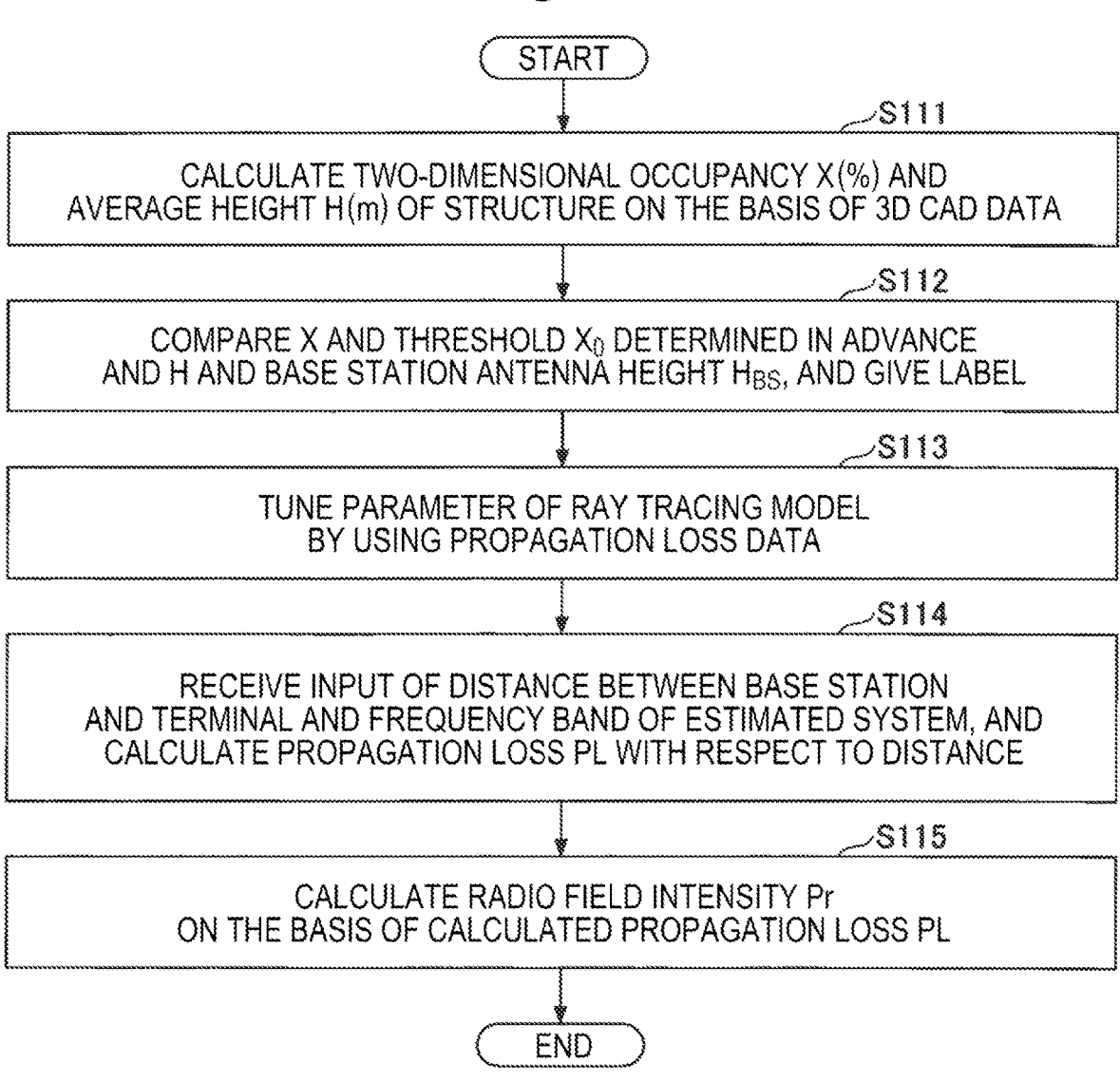

START

S111

CALCULATE TWO-DIMENSIONAL OCCUPANCY X(%) AND
AVERAGE HEIGHT H(m) OF STRUCTURE ON THE BASIS OF 3D CAD DATA

S112

COMPARE X AND THRESHOLD $X_0$ DETERMINED IN ADVANCE
AND H AND BASE STATION ANTENNA HEIGHT $H_{BS}$, AND GIVE LABEL

S113

TUNE PARAMETER OF RAY TRACING MODEL
BY USING PROPAGATION LOSS DATA

S114

RECEIVE INPUT OF DISTANCE BETWEEN BASE STATION
AND TERMINAL AND FREQUENCY BAND OF ESTIMATED SYSTEM, AND
CALCULATE PROPAGATION LOSS PL WITH RESPECT TO DISTANCE

S115

CALCULATE RADIO FIELD INTENSITY Pr
ON THE BASIS OF CALCULATED PROPAGATION LOSS PL

END

Fig. 14

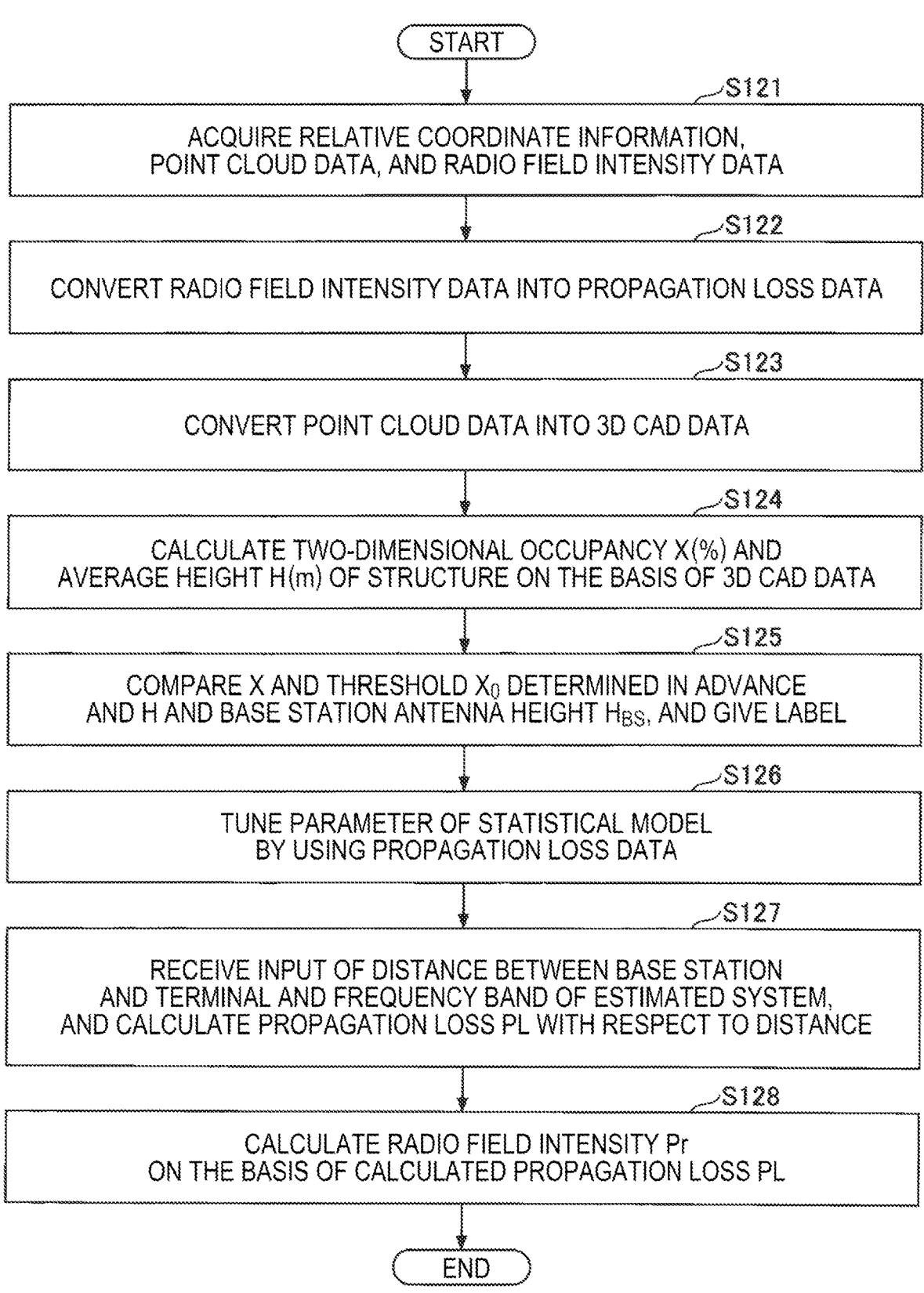

START

S121

ACQUIRE RELATIVE COORDINATE INFORMATION,
POINT CLOUD DATA, AND RADIO FIELD INTENSITY DATA

S122

CONVERT RADIO FIELD INTENSITY DATA INTO PROPAGATION LOSS DATA

S123

CONVERT POINT CLOUD DATA INTO 3D CAD DATA

S124

CALCULATE TWO-DIMENSIONAL OCCUPANCY X(%) AND
AVERAGE HEIGHT H(m) OF STRUCTURE ON THE BASIS OF 3D CAD DATA

S125

COMPARE X AND THRESHOLD $X_0$ DETERMINED IN ADVANCE
AND H AND BASE STATION ANTENNA HEIGHT $H_{BS}$, AND GIVE LABEL

S126

TUNE PARAMETER OF STATISTICAL MODEL
BY USING PROPAGATION LOSS DATA

S127

RECEIVE INPUT OF DISTANCE BETWEEN BASE STATION
AND TERMINAL AND FREQUENCY BAND OF ESTIMATED SYSTEM,
AND CALCULATE PROPAGATION LOSS PL WITH RESPECT TO DISTANCE

S128

CALCULATE RADIO FIELD INTENSITY Pr
ON THE BASIS OF CALCULATED PROPAGATION LOSS PL

END

Fig. 15

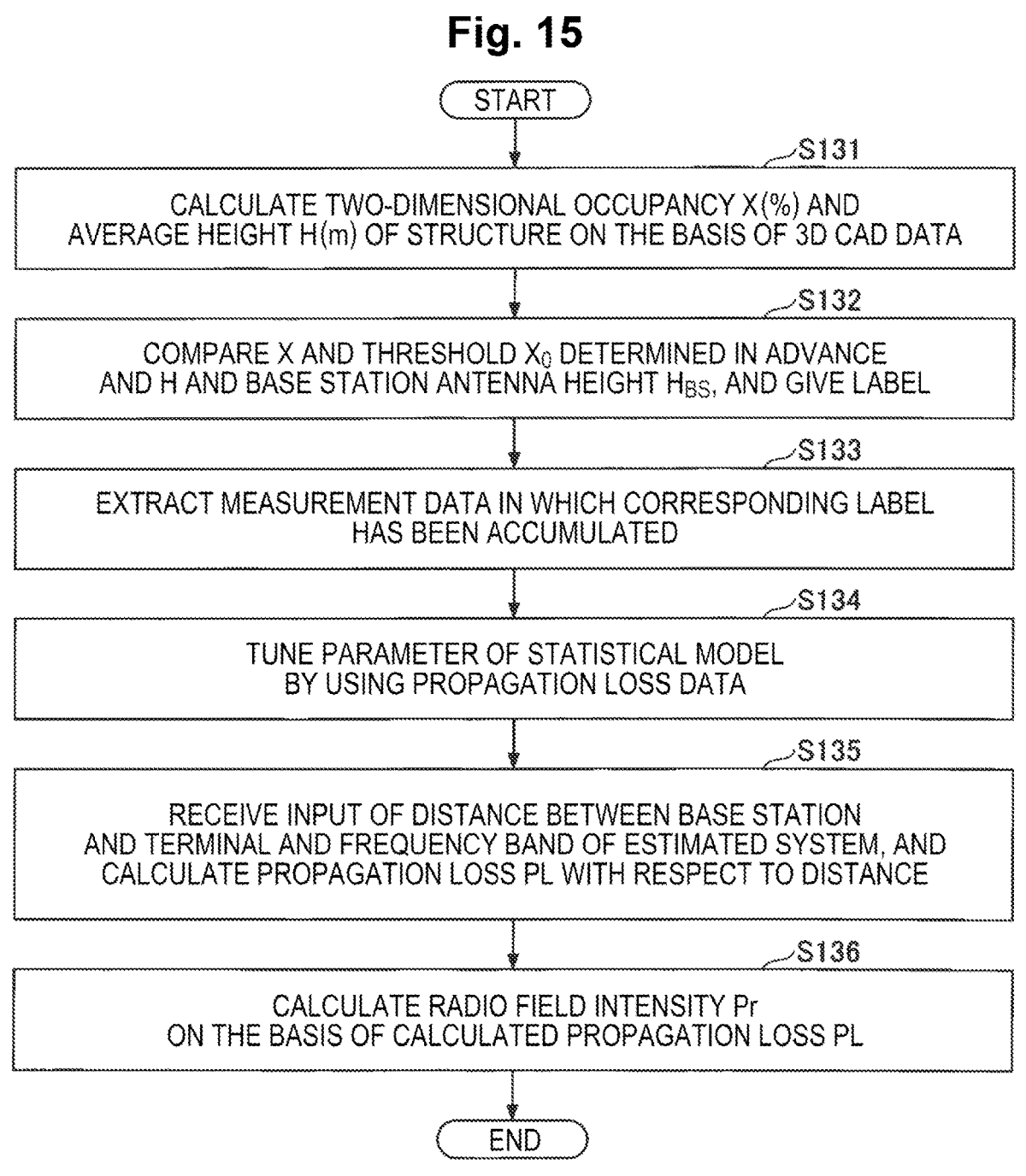

START

S131

CALCULATE TWO-DIMENSIONAL OCCUPANCY X(%) AND
AVERAGE HEIGHT H(m) OF STRUCTURE ON THE BASIS OF 3D CAD DATA

S132

COMPARE X AND THRESHOLD $X_0$ DETERMINED IN ADVANCE
AND H AND BASE STATION ANTENNA HEIGHT $H_{BS}$, AND GIVE LABEL

S133

EXTRACT MEASUREMENT DATA IN WHICH CORRESPONDING LABEL
HAS BEEN ACCUMULATED

S134

TUNE PARAMETER OF STATISTICAL MODEL
BY USING PROPAGATION LOSS DATA

S135

RECEIVE INPUT OF DISTANCE BETWEEN BASE STATION
AND TERMINAL AND FREQUENCY BAND OF ESTIMATED SYSTEM, AND
CALCULATE PROPAGATION LOSS PL WITH RESPECT TO DISTANCE

S136

CALCULATE RADIO FIELD INTENSITY Pr
ON THE BASIS OF CALCULATED PROPAGATION LOSS PL

END

Fig. 16

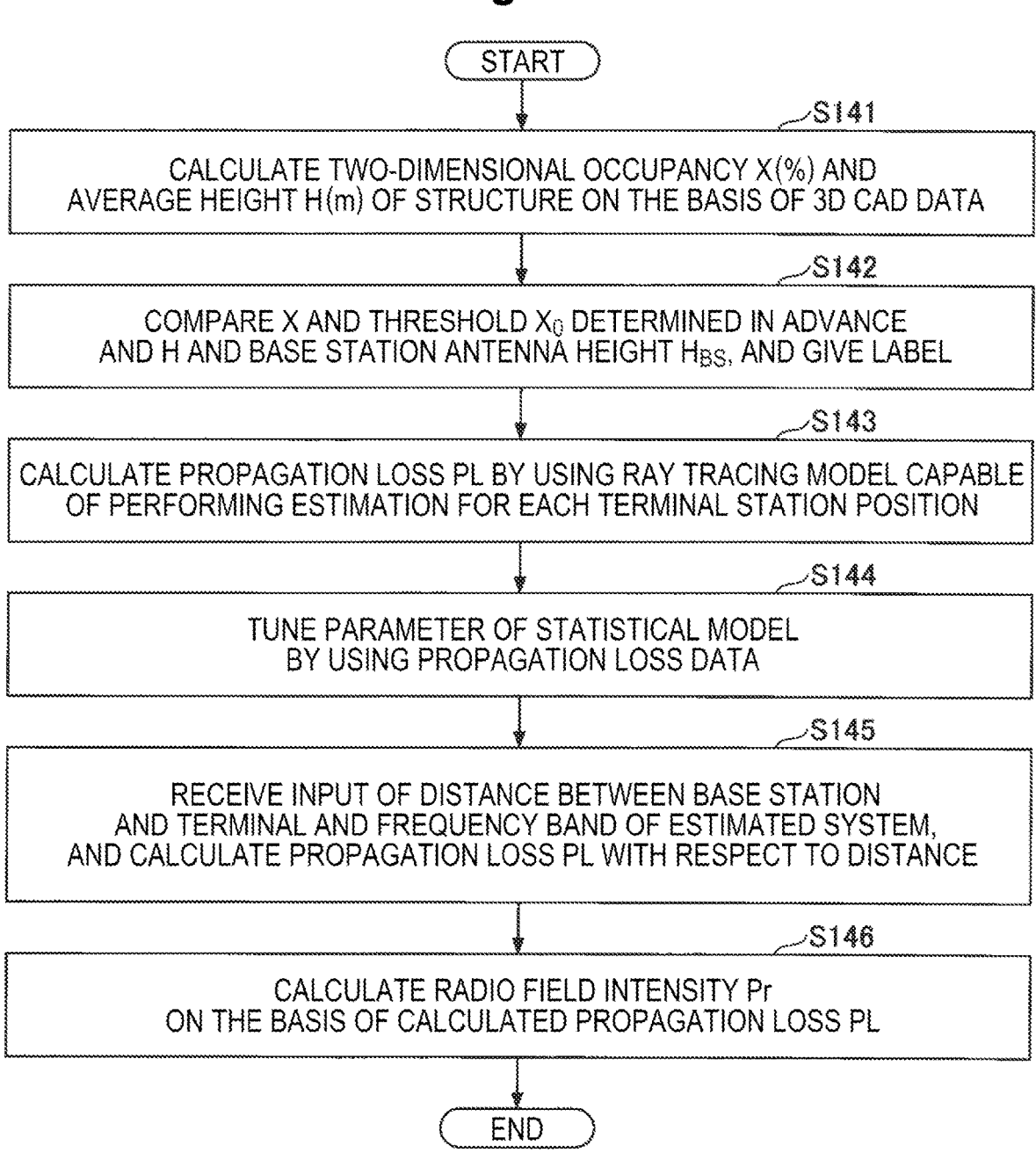

START

S141
CALCULATE TWO-DIMENSIONAL OCCUPANCY X(%) AND
AVERAGE HEIGHT H(m) OF STRUCTURE ON THE BASIS OF 3D CAD DATA

S142
COMPARE X AND THRESHOLD $X_0$ DETERMINED IN ADVANCE
AND H AND BASE STATION ANTENNA HEIGHT $H_{BS}$, AND GIVE LABEL

S143
CALCULATE PROPAGATION LOSS PL BY USING RAY TRACING MODEL CAPABLE
OF PERFORMING ESTIMATION FOR EACH TERMINAL STATION POSITION

S144
TUNE PARAMETER OF STATISTICAL MODEL
BY USING PROPAGATION LOSS DATA

S145
RECEIVE INPUT OF DISTANCE BETWEEN BASE STATION
AND TERMINAL AND FREQUENCY BAND OF ESTIMATED SYSTEM,
AND CALCULATE PROPAGATION LOSS PL WITH RESPECT TO DISTANCE

S146
CALCULATE RADIO FIELD INTENSITY Pr
ON THE BASIS OF CALCULATED PROPAGATION LOSS PL

END

COMMUNICATION DESIGN SUPPORT APPARATUS, COMMUNICATION DESIGN SUPPORT METHOD AND PROGRAM

TECHNICAL FIELD

The present invention relates to a technology for supporting design of wireless communication according to the user's purpose of use.

BACKGROUND ART

While the importance of social change by digitization has been increasing in recent years, traffic on smartphones and the like has increased, and various things have been connected with the development of the Internet of Things (IoT), for example. Thus, the role of wireless communication has been remarkably expanded in various situations of life. Meanwhile, various wireless communication standards have appeared for diversified applications of wireless communication, and wireless frequency bands used therefor have been expanded to a high frequency band from several hundred MHz to several ten GHz. Therefore, it has become necessary to use radio waves in different frequency bands having respective characteristics and different wireless communication standards for different situations. In such a complicated heterogeneous wireless communication environment, it is ideal that an appropriate wireless communication standard can be used in a natural manner at any time without the user's conscious choice.

CITATION LIST

Non-Patent Literature

Non-Patent Literature 1: Technology to Optimize Radio Access Networks: SON, July 2011 https://www.fujitsu.com/downloads/JP/archive/imgjp/jmag/vol 62-4/paper15.pdf

SUMMARY OF INVENTION

Technical Problem

However, quality of wireless communication changes from moment to moment depending on the situation, and the quality may not be stable due to an influence from a surrounding environment such as the user or a base station. Therefore, a technology for supporting design of wireless communication is required in order to enable the use of wireless communication with optimal quality according to the user's purpose of use.

An object of the disclosed technology is to support design of wireless communication according to the user's purpose of use.

Solution to Problem

The disclosed technology is a communication design support apparatus including: a propagation model storage unit that stores a propagation model; an acquisition unit that acquires data in which structure data containing coordinate data is associated with data indicating propagation loss; and a selection unit that selects data indicating classification of a characteristic of a communication environment in a structure indicated by the structure data based on the acquired data.

Advantageous Effects of Invention

According to the disclosed technology, it is possible to support design of wireless communication according to the user's purpose of use.

BRIEF DESCRIPTION OF DRAWINGS

FIG. 1 illustrates an example of the overall configuration of a communication design support system and an example of the functional configuration of a communication design support apparatus.

FIG. 2 is a flowchart showing an example of a flow of a communication design support process.

FIG. 5 is a flowchart showing an example of a flow of a statistical model tuning process.

FIG. 6 is a flowchart showing an example of a flow of an environment label selection process based on threshold determination.

FIG. 7 is a flowchart showing an example of a flow of a learning process of a classifier.

FIG. 8 is a flowchart showing an example of a flow of an environment label selection process based on determination by a classifier.

FIG. 9 is a flowchart showing an example of a flow of a frequency correction process.

FIG. 12 is a flowchart showing an example of a flow of a communication design support process according to a second example.

FIG. 13 is a flowchart showing an example of a flow of a communication design support process according to a third example.

FIG. 14 is a flowchart showing an example of a flow of a communication design support process according to a fourth example.

FIG. 15 is a flowchart showing an example of a flow of a communication design support process according to a fifth example.

FIG. 16 is a flowchart showing an example of a flow of a communication design support process according to a sixth example.

DESCRIPTION OF EMBODIMENTS

Figure 3:
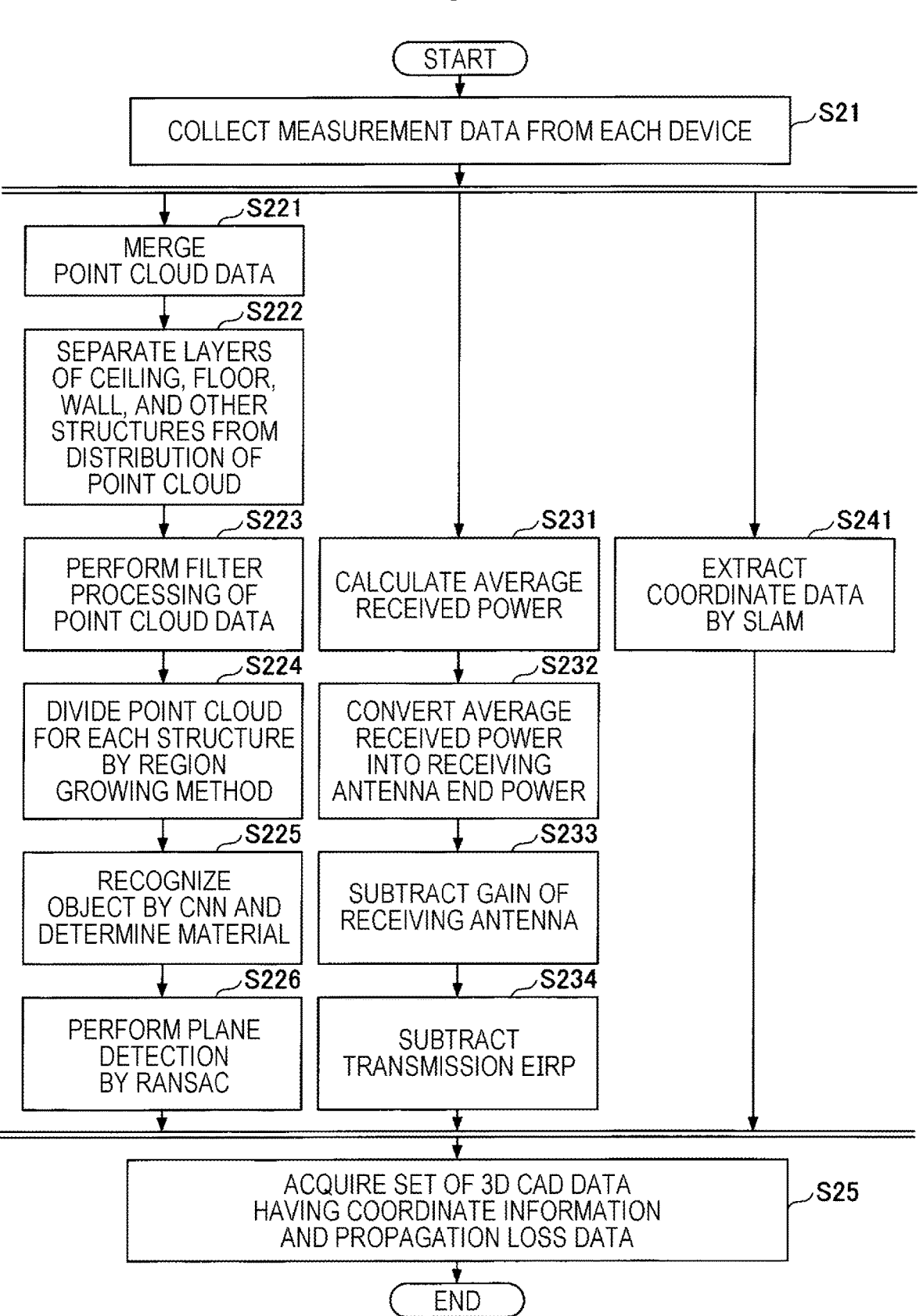
FIG. 3 is a flowchart showing an example of a flow of a 3D CAD data generation process.

Hereinafter, an embodiment of the present invention (present embodiment) will be described with reference to the drawings. The embodiment described below is merely an example, and an embodiment to which the present invention is applied is not limited to the following embodiment.

A communication design support system 1 according to the present embodiment is a system that supports communication design work in various processes such as installation, inspection, and proposal of a wireless communication system.

Example of Overall Configuration of Communication Design Support System 1

FIG. 1 illustrates an example of the overall configuration of a communication design support system and an example of the functional configuration of a communication design support apparatus. The communication design support system 1 includes a communication design support apparatus 10, an imaging device 20, a distance measuring device 30, and a wireless communication device 40.

The communication design support apparatus 10 includes a site survey unit 11, an environment label selection unit 12, a data processing unit 13, a radio field intensity estimation unit 14, and a propagation model storage unit 15.

The imaging device 20 is, for example, a camera, and captures images of an environment in which communication takes place to acquire image data, followed by transmitting the image data to the communication design support apparatus 10.

The distance measuring device 30 is, for example, a sensor or LiDAR, and measures a distance between an installed object and an inner wall or the like in the environment in which communication takes place, followed by transmitting measurement data to the communication design support apparatus 10.

The wireless communication device 40 performs wireless communication in the environment in which communication takes place, acquires information indicating identification of wireless communication such as received power, and transmits the information to the communication design support apparatus 10.

Example of Functional Configuration of Communication Design Support Apparatus 10

The communication design support apparatus 10 includes the site survey unit 11, the environment label selection unit 12, the data processing unit 13, the radio field intensity estimation unit 14, and the propagation model storage unit 15.

The propagation model storage unit 15 stores a propagation model that defines a process of estimating a radio field intensity of wireless communication. As the propagation model, various models such as a ray tracing model 101 and a statistical model 102 may be used. The propagation model storage unit 15 may store either the ray tracing model 101 or the statistical model 102, or may store both and select one to use.

The ray tracing model 101 is one type of propagation model that estimates the radio field intensity by using a method called a ray tracing method by which a radio wave is traced to simulate an image or the like observed at a certain point.

The statistical model 102 is one type of propagation model that estimates the radio field intensity by statistical calculation based on a distance between transmission and reception, an electric field intensity, and the like.

The site survey unit 11 acquires various kinds of information from the imaging device 20, the distance measuring device 30, the wireless communication device 40, and the like, and generates, for example, data indicating the structure of a building, an installed object, or the like in the environment in which communication takes place. The data is, for example, three-dimensional computer aided design (3D CAD) data.

The environment label selection unit 12 selects an environment label to be given to the propagation model on the basis of, for example, the various kinds of information acquired from the imaging device 20, the distance measuring device 30, the wireless communication device 40, and the like and the data indicating the structure generated by the site survey unit 11. The environment label is data indicating the classification of a characteristic of a communication environment.

The data processing unit 13 tunes the various propagation models stored in the propagation model storage unit 15 by applying a method such as machine learning.

The radio field intensity estimation unit 14 estimates, by applying the various propagation models, the radio field intensity in the environment in which communication takes place and which is to be designed.

Next, a basic operation of the communication design support system 1 will be described with reference to the drawings. FIG. 2 is a flowchart showing an example of a flow of a communication design support process. Specific operations according to various use cases will be described later in first to fourth examples.

The communication design support apparatus 10 starts the communication design support process in response to a user operation, for example. The site survey unit 11 acquires relative coordinate information, point cloud data, and radio field intensity data on the basis of data received from each device (step S11). The relative coordinate information indicates a relative positional relationship among an object, facility, and the like in the environment in which communication takes place. The point cloud data indicates three-dimensional coordinates of a large number of points showing a position and shape of a surface of the object in the environment in which communication takes place. The radio field intensity data indicates an intensity of a radio wave at each point in the environment in which communication takes place.

As an example, the site survey unit 11 applies a technology such as simultaneous localization and mapping (SLAM) to an image captured by the imaging device 20 or measurement data measured by the distance measuring device 30, thereby acquiring information indicating the coordinates of an object, facility, or the like to be designed as the relative coordinate information. The site survey unit 11 may simply receive the relative coordinate information to which the technology such as SLAM has been applied.

The site survey unit 11 analyzes the image captured by the imaging device 20, thereby acquiring point cloud data. The site survey unit 11 may simply receive the point cloud data as a result of image analysis.

The site survey unit 11 extracts the radio field intensity data from the measurement data received from the wireless communication device 40.

Thereafter, the site survey unit 11 converts the radio field intensity data into propagation loss data (step S12). For example, the site survey unit 11 calculates propagation loss PL according to Expression (1) below.

Propagation loss PL=output Pt−transmission feed loss Lt+transmission antenna gain Gt+receiving antenna gain Gr−reception feed loss Lr−radio field intensity Pr    (1)

The values on the right side of Expression (1) are included in the measurement data received from the wireless communication device 40.

Subsequently, the site survey unit 11 converts the point cloud data into 3D CAD data (step S13). The 3D CAD data indicates the shape of an object by a three-dimensional coordinate system. The processing from step S11 to step S13 may not be performed in this order. Details of the above processing will be described later.

The environment label selection unit 12 then selects an environment label to be given to a propagation model on the basis of a set of the 3D CAD data having coordinate information and the propagation loss data (step S14). Specifically, the environment label selection unit 12 extracts a feature (e.g., the density of structures in a case where the environment in which communication takes place is a factory) from the 3D CAD data with reference to a past model, and selects an environment label to be given by threshold determination. The environment label selection unit 12 may select the environment label to be given by using a classification machine learning device that has the function of automatically identifying a propagation environment. Details of the above processing will be described later.

The propagation model can also be considered to be a propagation model different for each environment label. In this case, selection of an environment label to be given can also be referred to as selection of a propagation model.

Thereafter, the data processing unit 13 tunes a parameter of the propagation model by using the propagation loss data (step S15). Specifically, the data processing unit 13 updates parameters of both the ray tracing model 101 and the statistical model 102. By tuning the propagation models according to the environment in which communication takes place, it is possible to improve estimation accuracy of the radio field intensity. Details of the processing in step S15 will be described later.

Then, the radio field intensity estimation unit 14 receives as an input a frequency band of an estimation system and calculates the propagation loss PL with respect to the distance (step S16). The estimation system is a system to be estimated in the environment in which communication takes place. Specifically, the radio field intensity estimation unit 14 inputs the frequency band to the propagation model (the ray tracing model 101 or the statistical model 102) to which the environment label has been given and performs simulation, thereby calculating the propagation loss PL. Then, the radio field intensity estimation unit 14 calculates a radio field intensity Pr according to Expression (2) below on the basis of the calculated propagation loss PL (step S17).

> Radio field intensity Pr=output Pt−transmission feed
> loss Lt+transmission antenna gain Gt+receiving
> antenna gain Gr−reception feed loss Lr−propa-
> gation loss PL (2)

In the following, details of the processes in the steps described above will be described.

FIG. 3 is a flowchart showing an example of a flow of a 3D CAD data generation process. The 3D CAD data generation process corresponds to the details of the processes from step S11 to step S13 described above.

The site survey unit 11 collects measurement data from each device (step S21). The site survey unit 11 then executes the first to third processing flows in parallel. Alternatively, the site survey unit 11 may sequentially process all or part of the first to third processing flows in an any selected order.

As the first processing flow, the site survey unit 11 merges the point cloud data (step S221). Specifically, in a case where the site survey unit 11 acquires point cloud data from a plurality of devices, the site survey unit performs translation and rotation of coordinates based on the positions of three reference markers, and merges the coordinates in order to match the coordinate systems thereof. Next, the site survey unit 11 separates layers of a ceiling, a floor, a wall, and other structures from the distribution of the point cloud (step S222). This is because a distribution of the amount of acquired point cloud data is different for a surface area.

The site survey unit 11 performs filter processing on the point cloud data (step S223). Specifically, the site survey unit 11 performs filter processing by downsampling using a "voxel grid filter" or the like. In a case where the collected measurement data is image data, the site survey unit 11 may perform modeling on the assumption that pixels of the image correspond to the point cloud. Next, the site survey unit 11 divides the point cloud for each structure by a region growing method (step S224).

Further, the site survey unit 11 recognizes an object by using a convolutional neural network (CNN) and gives typical material information to the recognized object (step S225). Then, the site survey unit 11 performs plane detection based on random sample consensus (RANSAC) (step S234). In the processing in step S234, the site survey unit 11 may detect a plane and then subdivide the plane into surface elements by Delaunay triangulation. By the first processing flow, 3D CAD data indicating various structures including structures provided in a building, such as a ceiling, a floor, and a wall, and installed objects inside the building is generated.

As the second processing flow, the site survey unit 11 calculates average received power for each measurement point on the basis of the received measurement data such as the radio field intensity (step S231). Then, the site survey unit 11 converts the average received power into receiving antenna end power (step S232), subtracts a gain of the receiving antenna (step S233), and subtracts transmission equivalent isotropic radiated power (EIRP) (step S234), thereby converting the subtracted receiving antenna end power into propagation loss data.

As the third processing flow, the site survey unit 11 extracts coordinate data by SLAM (step S241).

The site survey unit 11 integrates results of the first to third processing flows to acquire the set of the 3D CAD data having the coordinate information and the propagation loss data (step S25).

In propagation simulation used for conventional area design, propagation characteristics are estimated by using the CAD data of buildings, structures, and the like. However, in an indoor environment such as a factory, there may be no data indicating a layout of a structure in some cases. In such a case, it is necessary to manually create CAD of the environment.

In contrast, according to the communication design support apparatus 10 of the present embodiment, 3D CAD data is automatically generated on the basis of measurement data. Therefore, it is possible to design wireless communication, without relying on the skill of the user.

Note that the site survey unit 11 can include: an acquisition unit that acquires point cloud data of structures and measurement data of radio field intensities; a structure data generation unit that performs object recognition and material determination of the point cloud data and generates structure data indicating the shapes and materials of structures; a propagation loss calculation unit that calculates propagation loss on the basis of the measurement data of the radio field intensities in an environment including the structures; and an output unit that outputs data in which the structure data and propagation loss data are associated with each other.

The structure data indicating the shapes and materials of structures includes information related to quality of wireless communication. Therefore, the structure data is suitable for propagation simulation of wireless communication.

The site survey unit 11 can further include an extraction unit that extracts coordinate data by SLAM.

In the following, details of the processing in step S15 of the communication design support process will be described. In step S15, the data processing unit 13 tunes the ray tracing model 101 or the statistical model 102.

7

Figure 4:
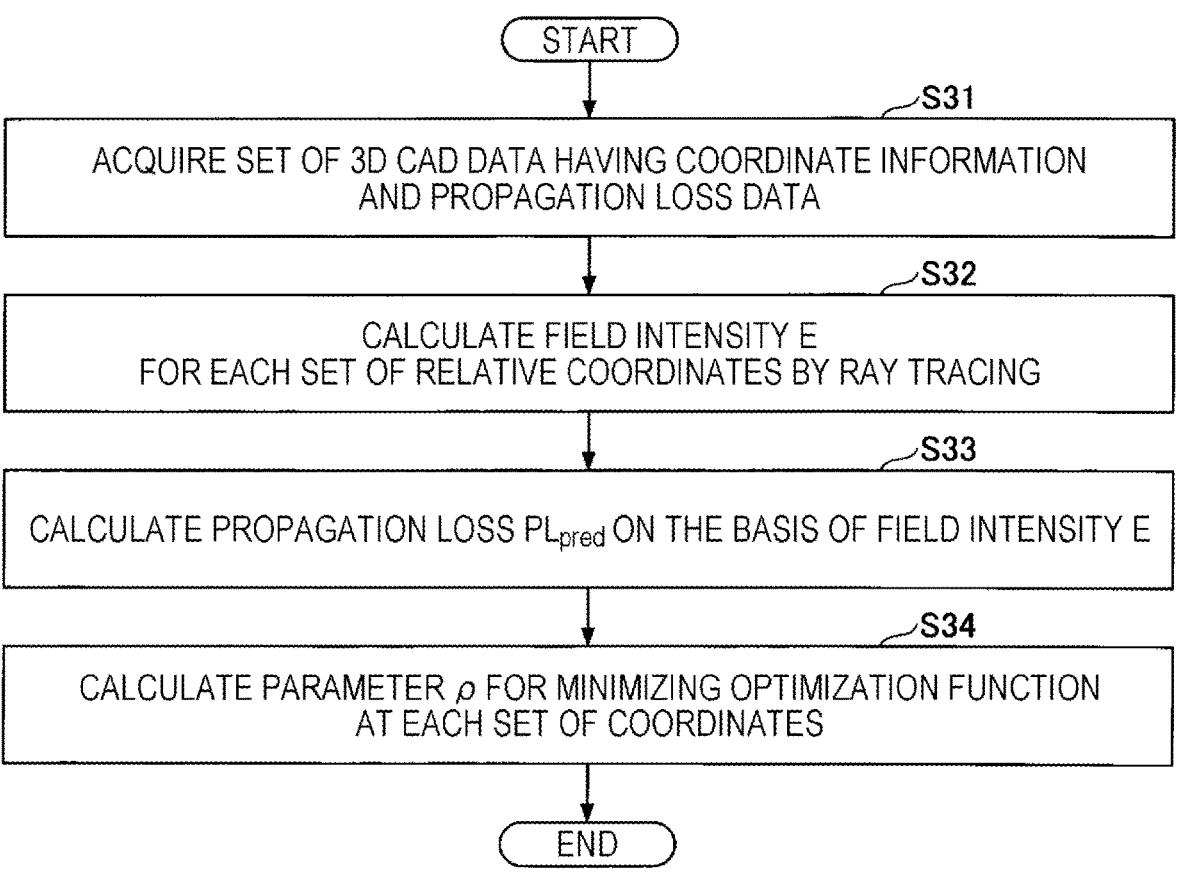
FIG. 4 is a flowchart showing an example of a flow of a ray tracing model tuning process.

FIG. 4 is a flowchart showing an example of a flow of a ray tracing model tuning process.

The data processing unit 13 acquires the set of the 3D CAD data having the coordinate information and the propagation loss data acquired by the processing in step S26 of the above-described 3D CAD data generation process (step S31). The propagation loss data is represented as (X, Y, Z, $PL_{meas}$). In a case where the frequency band of a wireless standard to be measured is different from the frequency band of a wireless standard to be estimated, it is necessary to estimate frequency characteristics in the data processing unit 13, and it is thus necessary to acquire propagation loss data of two or more different frequency bands for $PL_{meas}$.

The data processing unit 13 calculates an electric field intensity E for each set of relative coordinates by ray tracing on the basis of the following expression (step S32).

$$E = \frac{e^{-jkS_1}}{S_1} \prod_j \left[ \rho R_j(\theta, \mu, \varepsilon, \sigma, \omega) \right] \prod_m \left[ \sqrt{\frac{S_l}{(S_m + S_{m+1})}} D_l e^{-jkS_{m+1}} \right] \prod_l T_l \qquad \text{[Math. 1]}$$

Here, a reflection coefficient R has frequency characteristics, and the reflection coefficient varies depending on a relationship between wavelength and the material and shape of the structure or the like. The parameter p is a correction coefficient for correcting the frequency characteristics.

Thereafter, the data processing unit 13 calculates propagation loss $PL_{pred}$ by using the electric field intensity E on the basis of the following expression (step S33).

$$PL_{pred} = 20\log_{10}\frac{4\pi f}{c} - 20\log_{10}\sqrt{E_{re}^2 + E_{im}^2} \qquad \text{[Math. 2]}$$

Subsequently, the data processing unit 13 calculates the parameter ρ for minimizing an optimization function at each set of coordinates (step S34). The optimization function is, for example, $\Sigma(PL_{meas} - PL_{pred})^2$. In a case where the frequency characteristics are estimated, propagation loss data of two or more different frequency bands is used for $PL_{meas}$.

FIG. 5 is a flowchart showing an example of a flow of a statistical model tuning process.

The data processing unit 13 acquires the set of the 3D CAD data having the coordinate information and the propagation loss data acquired by the processing in step S26 of the previously-described 3D CAD data generation process (step S41). The propagation loss data is represented as (X, Y, Z, $PL_{meas}$). In a case where a frequency band of a wireless standard to be measured is different from a frequency band of a wireless standard to be estimated, it is necessary to estimate frequency characteristics in the data processing unit 13, and thus $PL_{meas}$ is propagation loss data for two or more different frequency bands.

Thereafter, the data processing unit 13 calculates a transmission-reception distance d for each set of relative coordinates (step S42). Then, the data processing unit 13 calculates the propagation loss $PL_{pred}$ by using the electric field intensity E on the basis of the following expression (step S43).

$$PL_{pred} = 10\alpha \log_{10} d + \gamma 10\beta \log_{10} f$$

Here, the parameter β has frequency characteristics and is a correction coefficient for correcting frequency characteristics.

Subsequently, the data processing unit 13 calculates the parameters α, β, and γ for minimizing an optimization function at each set of coordinates (step S44). In a case where the frequency characteristics are estimated, $PL_{meas}$ is propagation loss data for two or more different frequency bands.

In estimation of the radio field intensity in the conventional area design, each parameter to be used is calculated as a typical value based on measurement data obtained in various environments. Thus, there is a problem that a characteristic specific to a particular location cannot be evaluated. Further, because turning is performed on the measurement data of the measured wireless standard, there is a problem that evaluation is limited to a characteristic of the frequency band of the wireless standard.

The communication design support apparatus 10 according to the present embodiment tunes the propagation model according to the use environment by optimizing a ray tracing parameter (active reflection coefficient) or each coefficient of the statistical model based on an index indicative of estimation accuracy of the radio field intensity, on the basis of the propagation loss data obtained in the use environment and a result of simulation obtained based on the set of the relative coordinates, the 3D CAD data, and the propagation loss data obtained by the site survey. Therefore, it is possible to evaluate location-specific characteristics of a different frequency band.

The data processing unit 13 can also include: an acquisition unit that acquires data in which structure data containing coordinate data is associated with data indicating propagation loss; and a parameter update unit that updates a parameter of a propagation model on the basis of the acquired data. The parameter update unit can reflect frequency characteristics by applying the propagation model to calculate an electric field intensity and updating the parameter to a parameter for minimizing the propagation loss obtained from the calculated electric field intensity.

In the following, details of the processing in step S14 of the communication design support process will be described. In step S14, the environment label selection unit 12 tunes the ray tracing model 101 or the statistical model 102.

FIG. 6 is a flowchart showing an example of a flow of an environment label selection process based on threshold determination.

The environment label selection unit 12 acquires the set of the 3D CAD data having the coordinate information and the propagation loss data acquired by the processing in step S26 of the previously-described 3D CAD data generation process (step S51). Next, the environment label selection unit 12 calculates two-dimensional occupancy X (%) and an average height (m) of a structure on the basis of the 3D CAD data (step S52). Next, the environment label selection unit 12 compares X and threshold $X_0$ determined in advance and H and base station antenna height $H_{BS}$, and gives a label (step S53). Specifically, the label is determined as follows.

(1) a low-density and high-clutter model when $X_0 > X$ and $H_{BS} < H$ (2) a low-density and low-clutter model when $X_0 > X$ and $H_{BS} > H$ (3) a high-density and high-clutter model when $X_0 < X$ and $H_{BS} < H$ (4) a high-density and low-clutter model when $X_0 < X$ and $H_{BS} > H$ FIG. 7 is a flowchart showing an example of a flow of a learning process of a classifier. The environment label selection unit 12 acquires sets of 3D CAD data having coordinate information and propagation loss data acquired at a plurality of locations (step S61). Next, the environment label selection unit 12 calculates two-dimensional occupancy X (%) and an average height (m) of a structure on the basis of the 3D CAD data (step S62). Then, the environment label selection unit 12 generates a set of the propagation loss PL, the two-dimensional occupancy X (%), and the average height H (m) for each location (step S63). Then, the environment label selection unit 12 generates a classifier by classification machine learning, and gives a label to the generated group (step S64). The machine learning method may be any classification learning device and may be, for example, a k-nearest neighbors algorithm, a support vector machine (SVM), or linear discriminant analysis.

The environment label selection unit 12 selects an environment label by using the classifier trained in this manner. FIG. 8 is a flowchart showing an example of a flow of an environment label selection process based on determination by a classifier.

The environment label selection unit 12 acquires a set of 3D CAD data having coordinate information and propagation loss data acquired at a location to be estimated (step S71). Next, the environment label selection unit 12 calculates two-dimensional occupancy X (%) and an average height (m) of a structure on the basis of the 3D CAD data (step S72). Then, the environment label selection unit 12 inputs a set of the propagation loss PL, the two-dimensional occupancy X (%), and the average height H (m) to the classifier (step S73). Then, the environment label selection unit 12 determines to which label the data set of the location to be estimated belongs (step S74).

With respect to propagation characteristics, there are various propagation models such as multi-hop transmission and a two-ray model according to the use environment (e.g., location, antenna height, and frequency). In conventional actual use, the user needs to select an appropriate model from various models on the basis of a propagation measurement result. However, it takes time even for an expert to select a model, and, for a layman, even a task of discriminating models is difficult.

The communication design support apparatus 10 according to the present embodiment gives an environment label according to the use environment and therefore can obtain the same effect as that of selecting a propagation model according to the use environment.

The environment label selection unit 12 can also include: an acquisition unit that acquires data in which structure data containing coordinate data is associated with data indicating propagation loss; and a selection unit that selects data indicating the classification of a characteristic of a communication environment in a structure indicated by the structure data on the basis of the acquired data.

The acquisition unit can further acquire information indicating an antenna height of a base station, and the selection unit can calculate occupancy of the structure and a statistical value of a height of the structure and select the data indicating the classification of the characteristic of the communication environment on the basis of a result of comparison between a threshold determined in advance and the occupancy and a result of comparison between the antenna height and the statistical value.

The selection unit can also calculate occupancy of the structure and the statistical value of the height of the structure, input the calculated occupancy and statistical value to a classifier, and select the data indicating the classification of the characteristic of the communication environment.

The environment label selection unit 12 can further include a learning unit that learns a classifier by classification machine learning.

In the following, details of the processing in step S16 of the communication design support process will be described. In step S16, the radio field intensity estimation unit 14 calculates the propagation loss PL.

FIG. 9 is a flowchart showing an example of a flow of a frequency correction process.

The radio field intensity estimation unit 14 inputs the frequency band of the estimated system into the propagation model tuned by the data processing unit 13 (step S81). Then, the radio field intensity estimation unit acquires propagation loss output from the propagation model (step S82).

Conventionally, in a case where area evaluation of a new system is performed, there is a method of temporarily installing the new system to perform a site survey. However, there is a problem that it is difficult to perform a site survey of a wireless standard that requires a license, and thus area evaluation based on a survey result cannot be performed in advance.

The communication design support apparatus 10 according to the present embodiment calibrates propagation loss from existing (e.g., a wireless standard that does not need a license) sensed channel data, and tunes (tuning by the data processing unit 13) a parameter having frequency dependency (e.g., a reflection coefficient in ray tracing) in ray tracing or a statistical model. Then, the communication design support apparatus inputs a new (e.g., a wireless standard that needs a license) frequency to the tuned ray tracing model 101 or statistical model 102 and simulates the propagation loss, thereby estimating the radio field intensity.

The radio field intensity estimation unit 14 can include: an acquisition unit that acquires data in which structure data containing coordinate data is associated with data indicating propagation loss in a plurality of frequency bands; an input receiving unit that receives input of a frequency band for which a radio field intensity is to be estimated; and an estimation unit that inputs the frequency band to a propagation model and estimates propagation loss.

When estimating the radio field intensity on the basis of a ray tracing model, the radio field intensity estimation unit 14 may obtain two-dimensional ray tracing from a transmission point to a reception point of a radio wave and obtain three-dimensional ray tracing corresponding to the two-dimensional ray tracing by using height information of the transmission point and the reception point in order to speed up the estimation process. This makes it possible to search for a main ray and also to speed up the process while preventing degradation in accuracy, as compared with directly obtaining three-dimensional ray tracing.

When estimating the radio field intensity on the basis of the ray tracing model, the radio field intensity estimation unit 14 may convert data indicating a width, height, shape, position, and the like of each surface of an object (e.g., structure or building) in a target area into two-dimensional mesh data. The mesh data has a format of image data and thus can be read and processed at high speed by using a graphics processing unit (GPU).

The communication design support apparatus 10 can include: a propagation model storage unit that stores a propagation model; an acquisition unit that acquires point cloud data of a structure and measurement data of radio wave intensities in a plurality of frequency bands; a parameter update unit that updates a parameter of the propagation model on the basis of the acquired data; and an estimation unit that estimates propagation loss on the basis of the propagation model. This makes it possible to achieve communication design that does not rely on the skill of the user.

Hardware Configuration Example

The communication design support apparatus 10 according to the present embodiment can be achieved by, for example, causing a computer to execute a program in which the processes described in the present embodiment are coded.

The above program can be recorded in a computer-readable recording medium (e.g., portable memory) to be stored or distributed. Further, the above program can also be provided via a network such as the Internet or e-mail.

Figure 10:
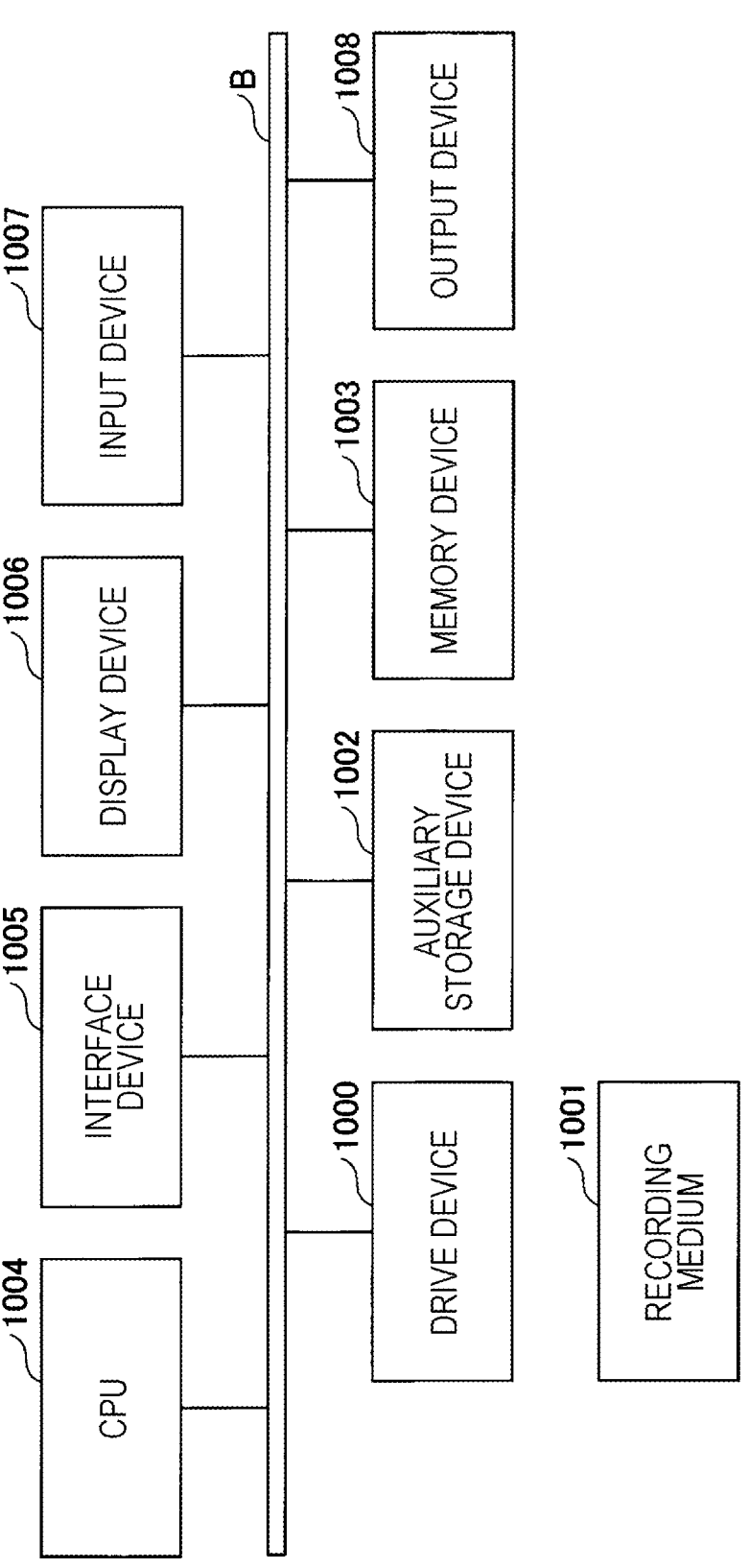
FIG. 10 illustrates an example of the hardware configuration of a computer.

FIG. 10 illustrates an example of the hardware configuration of the computer. The computer in FIG. 10 includes, for example, a drive device 1000, an auxiliary storage device 1002, a memory device 1003, a CPU 1004, an interface device 1005, a display device 1006, an input device 1007, and an output device 1008 that are connected to one another by a bus B.

The program for implementing processes in the computer is provided by, for example, a recording medium 1001 such as a CD-ROM or memory card. When the recording medium 1001 storing the program is set in the drive device 1000, the program is installed from the recording medium 1001 into the auxiliary storage device 1002 via the drive device 1000. However, the program is not necessarily installed from the recording medium 1001 and may be downloaded from another computer via a network. The auxiliary storage device 1002 stores the installed program and also stores necessary files, data, and the like.

In a case where an instruction to start the program is issued, the memory device 1003 reads the program from the auxiliary storage device 1002 and stores the program therein. The CPU 1004 implements the function of each unit described in the present embodiment in accordance with the program stored in the memory device 1003. The interface device 1005 is used as an interface for connecting to a network. The display device 1006 displays a GUI or the like by the program. The input device 1007 includes, for example, a keyboard, a mouse, buttons, and a touchscreen and is used to enter various operating instructions. The output device 1008 outputs a computation result. In the communication design support apparatus 10, alternatively, only one or none of the display device 1006 and the input device 1007 may be provided.

Hereinafter, the first to sixth examples will be described as specific examples of the technology according to the present embodiment. Each of the first to sixth examples can be appropriately combined and implemented.

First Example

In the first example, for the purpose of automating local survey work, a local staff member takes photographs by using a tablet terminal such as a smartphone, acquires Lidar, and measures a radio field intensity of a measurement-purpose wireless standard while moving on the premises. The communication design support apparatus 10 creates and displays 3D CAD data on the basis of the measurement result.

Figure 11:
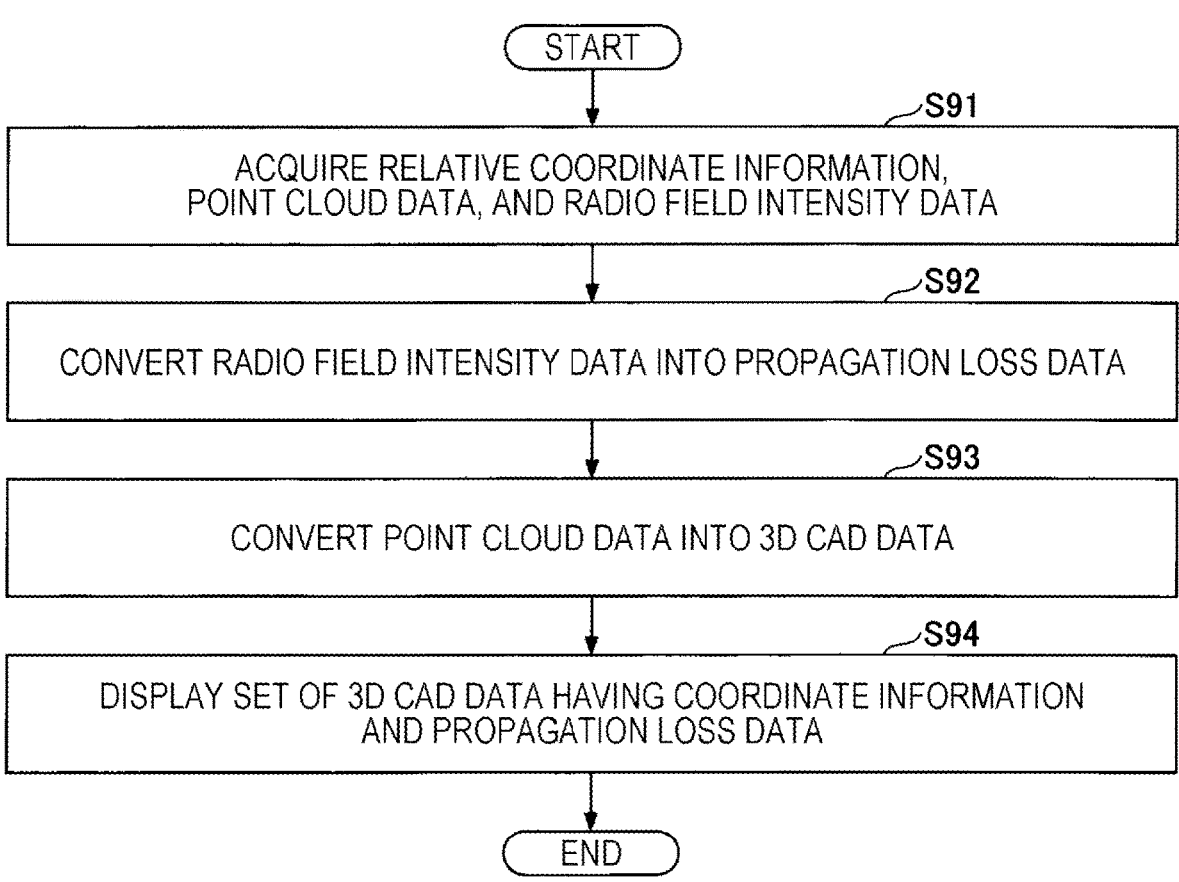
FIG. 11 is a flowchart showing an example of a flow of a communication design support process according to a first example.

FIG. 11 is a flowchart showing an example of a flow of a communication design support process according to the first example.

A user such as a local staff member inputs account information and information indicating a wireless standard.

For example, the user inputs account information and inputs information such as 2.4 GHz WLAN, 5 GHz WLAN, and 60 GHz WiGig as measurement-purpose wireless standards. The site survey unit 11 acquires relative coordinate information, point cloud data, and radio field intensity data on the basis of the input information (step S91). The point cloud data, the radio field intensity, and the coordinates are acquired by different modules and thus are matched by using timestamps. Then, the site survey unit 11 refers to a conversion table of received power and receiving antenna end power of a measurement device, transmission EIRP information, and the like on the basis of the wireless standard information and converts the radio field intensity data into propagation loss data (step S92). Next, the site survey unit 11 converts the point cloud data into 3D CAD data (step S93).

Thereafter, the site survey unit 11 displays a set of the 3D CAD data having coordinate information and the propagation loss data (step S94).

The local staff member or a sales/SE staff member may refer to the created set of the 3D CAD data and the propagation loss data, or may retrieve and use the set for designing.

Second Example

The second example shows an example in which a local staff member makes a simplified estimation of the propagation quality of a wireless standard different from a measurement-purpose wireless standard on the basis of a measurement result of the measurement-purpose wireless standard, and uses the estimated propagation quality to estimate a facility scale or the like.

FIG. 12 is a flowchart showing an example of a flow of s communication design support process according to the second example.

A user such as a local staff member inputs an estimated base station position, a terminal station design condition (e.g., position information), wireless standards used for measurement or estimation, and account information. For example, the user inputs account information, inputs information such as 2.4 GHz WLAN, 5 GHz WLAN, and 60 GHz WiGig as the measurement-purpose wireless standard, and inputs information such as 4.8 GHz L5G and 28 GHz L5G as the estimation-purpose wireless standard.

The environment label selection unit 12 calculates two-dimensional occupancy X (%) and an average height (m) of a structure on the basis of the 3D CAD data (step S101). Next, the environment label selection unit 12 compares X and the threshold $X_0$ determined in advance and H and the base station antenna height $H_{BS}$, and gives a label (step S102). In the radio field intensity estimation unit 14, the statistical model and the ray tracing model are significantly different from each other in calculation time thereof and a feature of propagation quality information to be output. In the ray tracing model, propagation loss can be estimated for each location, whereas only a change in the propagation loss with respect to a distance can be estimated in the statistical model. However, the ray tracing model requires longer calculation time than the statistical model. Therefore, the statistical model is used to make a simplified estimation of a facility scale or the like on the premises. The data processing unit 13 tunes a parameter of the statistical model by using the propagation loss data (step S103). Then, the radio field intensity estimation unit 14 receives as inputs a distance between the base station and the terminal and a frequency band of an estimated system, and calculates the propagation loss PL with respect to the distance (step S104). The radio field intensity estimation unit 14 calculates the radio field intensity Pr on the basis of the calculated propagation loss PL (step S105).

Note that the local staff member or sales/SE staff member can perform design, estimation, or the like on the basis of the estimated radio field intensity Pr.

Third Example

The third example shows an example in which a staff member for operating and designing wireless facilities estimates propagation quality of a wireless standard different from a measurement-purpose wireless standard for each designated terminal station position on the basis of a measurement result of the measurement-purpose wireless standard, and designs a wireless parameter.

FIG. 13 is a flowchart showing an example of a flow of a communication design support process according to the third example.

A user such as a local staff member inputs an estimated base station, a terminal station design condition (e.g., position information), wireless standards used for measurement or estimation, and account information. For example, the user inputs account information, inputs information such as 2.4 GHz WLAN, 5 GHz WLAN, and 60 GHz WiGig as the measurement-purpose wireless standard, and inputs information such as 4.8 GHz L5G and 28 GHz L5G as the estimation-purpose wireless standard.

The environment label selection unit 12 calculates two-dimensional occupancy X (%) and an average height (m) of a structure on the basis of 3D CAD data (step S111). Next, the environment label selection unit 12 compares X and the threshold $X_0$ determined in advance and H and the base station antenna height $H_{BS}$, and gives a label (step S112). The radio field intensity estimation unit 14 is to use a ray tracing model capable of performing estimation for each terminal station position, and thus the data processing unit 13 tunes a parameter of the ray tracing model by using propagation loss data (step S113). Then, the radio field intensity estimation unit 14 receives as inputs a distance between the base station and the terminal and the frequency band of an estimated system, and calculates the propagation loss PL with respect to the distance (step S114). The radio field intensity estimation unit 14 calculates the radio field intensity Pr on the basis of the calculated propagation loss PL (step S115).

The staff member for operating and designing wireless facilities can design, for example, wireless parameters based on the estimated radio field intensity Pr.

Fourth Example

The fourth example shows an example in which a local staff member or sales/SE staff member determines whether to change a system in advance in a wireless standard operation phase in an indoor local area.

FIG. 14 is a flowchart showing an example of a flow of a communication design support process according to the fourth example.

The site survey unit 11 acquires relative coordinate information, point cloud data, and radio field intensity data (step S121). Next, the site survey unit 11 converts the radio field intensity data into propagation loss data (step S122). Then, the site survey unit 11 converts the point cloud data into 3D CAD data (step S123). Next, the environment label selection unit 12 calculates two-dimensional occupancy X (%) and an average height (m) of a structure on the basis of the 3D CAD data (step S124). The environment label selection unit 12 compares X and the threshold $X_0$ determined in advance and H and the base station antenna height $H_{BS}$, and gives a label (step S125).

The radio field intensity estimation unit 14 is to use a statistical model whose calculation time is short, and thus the data processing unit 13 tunes a parameter of the statistical model by using the propagation loss data (step S126). Then, the radio field intensity estimation unit 14 receives as inputs a distance between the base station and the terminal and a frequency band of an estimated system, and calculates the propagation loss PL with respect to the distance (step S127). The radio field intensity estimation unit 14 calculates the radio field intensity Pr on the basis of the calculated propagation loss PL (step S128).

Note that, instead of the above processing from step S121 to step S123, the communication design support apparatus 10 may use the 3D CAD data of the corresponding area manually edited by the user. The site survey unit 11 may have a function of receiving editing of the 3D CAD data by the user.

The local staff member or sales/SE staff member can determine whether to change the design of a wireless standard currently in operation on the basis of the estimated radio field intensity Pr.

Fifth Example

The fifth example shows an example of estimating the propagation quality of a new wireless standard when an indoor local area (e.g., factory) is newly established.

FIG. 15 is a flowchart showing an example of a flow of a communication design support process according to the fifth example.

A user such as a local staff member or sales/SE staff member creates 3D CAD data on the basis of layout data of a new environment and activates the environment label selection unit 12.

The environment label selection unit 12 calculates two-dimensional occupancy X (%) and an average height (m) of a structure on the basis of the 3D CAD data (step S131). The environment label selection unit 12 compares X and the threshold $X_0$ determined in advance and H and the base station antenna height $H_{BS}$, and gives a label (step S132).

Then, in response a user operation, the data processing unit 13 extracts accumulated measurement data that has the noted label (step S133). The radio field intensity estimation unit 14 is to use a statistical model whose calculation time is short, and thus the data processing unit 13 tunes a parameter of the statistical model by using propagation loss data (step S134). Then, the radio field intensity estimation unit 14 receives as inputs a distance between the base station and the terminal and a frequency band of an estimated system, and calculates the propagation loss PL with respect to the distance (step S135). The radio field intensity estimation unit 14 calculates the radio field intensity Pr on the basis of the calculated propagation loss PL (step S136).

The local staff member or sales/SE staff member can estimate the propagation quality of a new wireless standard on the basis of the estimated radio field intensity Pr and use the propagation quality for estimation, sales, design, or the like.

Sixth Example

The sixth example shows an example in which, when there is no layout data and a wireless standard cannot be measured in the case of newly establishing an indoor local area (e.g., factory), propagation quality of the wireless standard is estimated and is used for estimation of a facility scale or the like.

FIG. 16 is a flowchart showing an example of a flow of a communication design support process according to the sixth example.

The local staff member or sales/SE staff member manually creates a typical indoor local area environment as 3D CAD data and activates the environment label selection unit 12.

The environment label selection unit 12 calculates two-dimensional occupancy X (%) and an average height (m) of a structure on the basis of the 3D CAD data (step S141). The environment label selection unit 12 compares X and the threshold $X_0$ determined in advance and H and the base station antenna height $H_{BS}$, and gives a label (step S142). Next, the radio field intensity estimation unit 14 calculates the propagation loss PL by using a ray tracing model capable of performing estimation for each terminal station position (step S143).

Then, the data processing unit 13 tunes a parameter of the statistical model by using the calculated propagation loss data (step S144). Next, the radio field intensity estimation unit 14 receives as inputs a distance between the base station and the terminal and a frequency band of an estimated system, and calculates the propagation loss PL with respect to the distance (step S145). The radio field intensity estimation unit 14 calculates the radio field intensity Pr on the basis of the calculated propagation loss PL (step S146).

When there is no layout data and a wireless standard cannot be measured in the case of newly establishing an indoor local area (e.g. factory), the local staff member or sales/SE staff member can estimate the propagation quality of the wireless standard and estimate the facility scale or the like.

Effects of Embodiment

According to the technology of the present embodiment, it is possible to support design of wireless communication according to varying purposes of use by users, as in the first to sixth examples. Note that each functional unit (the site survey unit 11, the environment label selection unit 12, the data processing unit 13, and the radio field intensity estimation unit 14) of the communication design support apparatus 10 performs a function appropriately selected in response to a user operation as described in the first to sixth examples.

Summary of Embodiment

The present specification discloses at least a communication design support apparatus, a communication design support method, and a program in the following items.
Item 1
  A communication design support apparatus including:
  a propagation model storage unit that stores a propagation model;
  an acquisition unit that acquires data in which structure data containing coordinate data is associated with data indicating propagation loss; and
  a selection unit that selects data indicating classification of a characteristic of a communication environment in a structure indicated by the structure data based on the acquired data.

Item 2
  The communication design support apparatus according to item 1, in which
    the acquisition unit further acquires information indicating an antenna height of a base station, and
    the selection unit calculates occupancy of the structure and a statistical value of a height of the structure and selects the data indicating the classification of the characteristic of the communication environment based on a result of comparison between a threshold determined in advance and the occupancy and a result of comparison between the antenna height and the statistical value.
Item 3
  The communication design support apparatus according to item 1, in which
    the selection unit calculates occupancy of the structure and a statistical value of a height of the structure, inputs the calculated occupancy and statistical value to a classifier, and selects the data indicating the classification of the characteristic of the communication environment.
Item 4
  The communication design support apparatus according to item 3, further including
    a learning unit that learns the classifier by classification-type machine learning.
Item 5
  A communication design support method performed by a computer storing a propagation model, the method including:
    a step of acquiring data in which structure data containing coordinate data is associated with data indicating propagation loss; and
    a step of selecting data indicating classification of a characteristic of a communication environment in a structure indicated by the structure data based on the acquired data.
Item 6
  A program for causing a computer to function as the communication design support apparatus according to any one of items 1 to 4.

The present embodiment has been described above, but the present invention is not limited to such a specific embodiment, and various modifications and changes can be made within the scope of the gist of the present invention described in the claims.

REFERENCE SIGNS LIST

1 Communication design support system
  10 Communication design support apparatus
  11 Site survey unit
  12 Environment label selection unit
  13 Data processing unit
  14 Radio field intensity estimation unit
  15 Propagation model storage unit
  20 Imaging device
  30 Distance measuring device
  40 Wireless communication device
  101 Ray tracing model
  102 Statistical model
  1000 Drive device
  1001 Recording medium
  1002 Auxiliary storage device
  1003 Memory device
  1004 CPU
  1005 Interface device

1006 Display device
1007 Input device
1008 Output device

The invention claimed is:

1. A communication design support apparatus comprising:
a memory; and
a processor coupled to the memory and configured to:
store a propagation model in the memory;
acquire data in which structure data containing coordinate data is associated with data indicating propagation loss; and
select data indicating classification of a characteristic of a communication environment in a structure indicated by the structure data based on a feature extracted from the acquired data including the coordinate data and the propagation loss data.

2. The communication design support apparatus according to claim 1, wherein
the processor is configured to
acquire information indicating an antenna height of a base station, and
calculate occupancy of the structure and a statistical value of a height of the structure and select the data indicating the classification of the characteristic of the communication environment based on a result of comparison between a threshold determined in advance and the occupancy and a result of comparison between the antenna height and the statistical value.

3. The communication design support apparatus according to claim 1, wherein
the processor is configured to calculate occupancy of the structure and a statistical value of a height of the structure, input the calculated occupancy and statistical value to a classifier, and select the data indicating the classification of the characteristic of the communication environment.

4. The communication design support apparatus according to claim 3, wherein
the processor is further configured to learn the classifier by classification machine learning.

5. A communication design support method performed by a computer storing a propagation model, the method comprising:
acquiring data in which structure data containing coordinate data is associated with data indicating propagation loss; and
selecting data indicating classification of a characteristic of a communication environment in a structure indicated by the structure data based on a feature extracted from the acquired data including the coordinate data and the propagation loss data.

6. A non-transitory computer readable recording medium having a program embodied therein for causing a computer to perform the communication design support method of claim 5.

7. A communication design support apparatus comprising:
a memory; and
a processor coupled to the memory and configured to:
store a propagation model in the memory;
acquire data in which structure data containing coordinate data is associated with data indicating propagation loss; and
select data indicating classification of a characteristic of a communication environment in a structure indicated by the structure data based on the acquired data,
wherein the processor is configured to calculate occupancy of the structure and a statistical value of a height of the structure, input the calculated occupancy and statistical value to a classifier, and select the data indicating the classification of the characteristic of the communication environment.

8. The communication design support apparatus according to claim 7, wherein
the processor is further configured to learn the classifier by classification machine learning.

* * * * *